(12) United States Patent
Kurihara

(10) Patent No.: US 10,379,605 B2
(45) Date of Patent: Aug. 13, 2019

(54) HEAD MOUNTED DISPLAY, MOBILE INFORMATION TERMINAL, IMAGE PROCESSING APPARATUS, DISPLAY CONTROL PROGRAM, DISPLAY CONTROL METHOD, AND DISPLAY SYSTEM

(71) Applicant: Sony Interactive Entertainment Inc., Tokyo (JP)

(72) Inventor: Yosuke Kurihara, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 77 days.

(21) Appl. No.: 15/517,316

(22) PCT Filed: Oct. 16, 2015

(86) PCT No.: PCT/JP2015/079276
§ 371 (c)(1),
(2) Date: Apr. 6, 2017

(87) PCT Pub. No.: WO2016/063801
PCT Pub. Date: Apr. 28, 2016

(65) Prior Publication Data
US 2017/0308158 A1    Oct. 26, 2017

(30) Foreign Application Priority Data

Oct. 22, 2014 (JP) ................. 2014-215565

(51) Int. Cl.
*G06F 3/01* (2006.01)
*G06F 3/0488* (2013.01)
(Continued)

(52) U.S. Cl.
CPC ............ *G06F 3/012* (2013.01); *A63F 13/214* (2014.09); *A63F 13/24* (2014.09); *A63F 13/25* (2014.09);
(Continued)

(58) Field of Classification Search
CPC ........ G06F 3/016; G06F 3/012; G06F 3/0412; G06F 3/01; G06F 3/048; G06F 3/0488;
(Continued)

(56) References Cited

U.S. PATENT DOCUMENTS 9,606,612 B2    3/2017  Milford
10,191,281 B2   1/2019  Goto
(Continued)

FOREIGN PATENT DOCUMENTS

EP    2587300 A1 *  5/2013   ............ G06F 1/163
EP    2587300 A1    5/2013
(Continued)

OTHER PUBLICATIONS

Partial Supplementary European Search Report for corresponding EP Application No. 15852710.1, 17 pages, dated Apr. 11, 2018.
(Continued)

*Primary Examiner* — Mark W Regn
(74) *Attorney, Agent, or Firm* — Matthew B. Dernier, Esq.

(57) ABSTRACT

A head-mounted display wearable on the head of a user includes: a display device disposed on an inner surface of the head-mounted display worn by the user on the head; a touch pad disposed on an outer surface of the head-mounted display worn by the user on the head, the touch pad being able to detect contact with or proximity of a body part of the user; and a display controlling unit acquiring data of an image generated on the basis of input information indicative of the touch pad detecting the contact with or the proximity of the body part of the user, the display controlling unit further causing a display device to display the acquired image data.

6 Claims, 19 Drawing Sheets

(51) Int. Cl.
- *G06F 3/048* (2013.01)
- *G09G 5/00* (2006.01)
- *A63F 13/25* (2014.01)
- *A63F 13/426* (2014.01)
- *G06F 3/041* (2006.01)
- *G06K 9/00* (2006.01)
- *A63F 13/24* (2014.01)
- *A63F 13/533* (2014.01)
- *A63F 13/214* (2014.01)

(52) U.S. Cl.
CPC .......... *A63F 13/426* (2014.09); *A63F 13/533* (2014.09); *G06F 3/01* (2013.01); *G06F 3/016* (2013.01); *G06F 3/048* (2013.01); *G06F 3/0412* (2013.01); *G06F 3/0488* (2013.01); *G06K 9/00369* (2013.01); *G09G 5/00* (2013.01)

(58) Field of Classification Search
CPC ... G06K 9/00369; A63F 13/214; A63F 13/24; A63F 13/533; A63F 13/426; A63F 13/25; G09G 5/00
USPC .............................................................. 345/8
See application file for complete search history.

(56) References Cited

U.S. PATENT DOCUMENTS

| | | |
|---|---|---|
| 2005/0256675 A1 | 11/2005 | Kurata |
| 2010/0079356 A1 | 4/2010 | Hoellwarth |
| 2011/0194029 A1 | 8/2011 | Herrmann |
| 2012/0056847 A1 | 3/2012 | Milford |
| 2013/0163090 A1 | 6/2013 | Yu |
| 2013/0181888 A1 | 7/2013 | Kuriya |
| 2013/0335321 A1 | 12/2013 | Sugita |
| 2014/0320383 A1 | 10/2014 | Goto |
| 2015/0143283 A1 | 5/2015 | Noda |

FOREIGN PATENT DOCUMENTS

| | | | |
|---|---|---|---|
| EP | 2674850 A2 * | 12/2013 | ........... G06F 3/0488 |
| EP | 2674850 A2 | 12/2013 | |
| EP | 3098689 A1 | 11/2016 | |
| JP | 2003289484 A | 10/2003 | |
| JP | 2004085476 A | 3/2004 | |
| JP | 2007310599 A | 11/2007 | |
| JP | 2008028552 A | 2/2008 | |
| JP | 2013125247 A | 6/2013 | |
| JP | 2013528871 A | 7/2013 | |
| JP | 2013150118 A | 8/2013 | |
| JP | 2013190925 A | 9/2013 | |
| JP | 2013258573 A | 12/2013 | |
| JP | 2014071812 A | 4/2014 | |
| JP | 2014145734 A | 8/2014 | |
| JP | 2014145734 A * | 8/2014 | |
| WO | 2005022236 A1 | 3/2005 | |
| WO | 2012011893 A1 | 1/2012 | |
| WO | 2013088725 A1 | 6/2013 | |
| WO | 2014054211 A1 | 4/2014 | |

OTHER PUBLICATIONS

Andrea Colao et al: "Mime : compact, low power 3D gesture sensing for interaction with head mounted displays," Proceedings of the 26th Annual ACM Symposium on User Interface Software and Technology, UIST '13, pp. 227-236, (Jan. 1, 2013).

International Preliminary Report on Patentability and Written Opinion for corresponding PCT Application No. PCT/JP2015/079276, 11 pages, dated May 4, 2017.

Extended European Search Report for corresponding EP Application No. 15852710.1, 17 pages, dated Jun. 21, 2018.

Logan Olson J et al., "A design for a smartphone-based head mounted display," Virtual Reality Conference (VR), pp. 233-234, Mar. 19, 2011.

International Search Report for corresponding PCT Application No. PCT/JP2015/079276, 4 pages, dated Nov. 17, 2015.

Notification of Reasons for Refusal for corresponding JP Application No. 2018092931, 16 pages, dated Feb. 26, 2019.

* cited by examiner

FIG.1
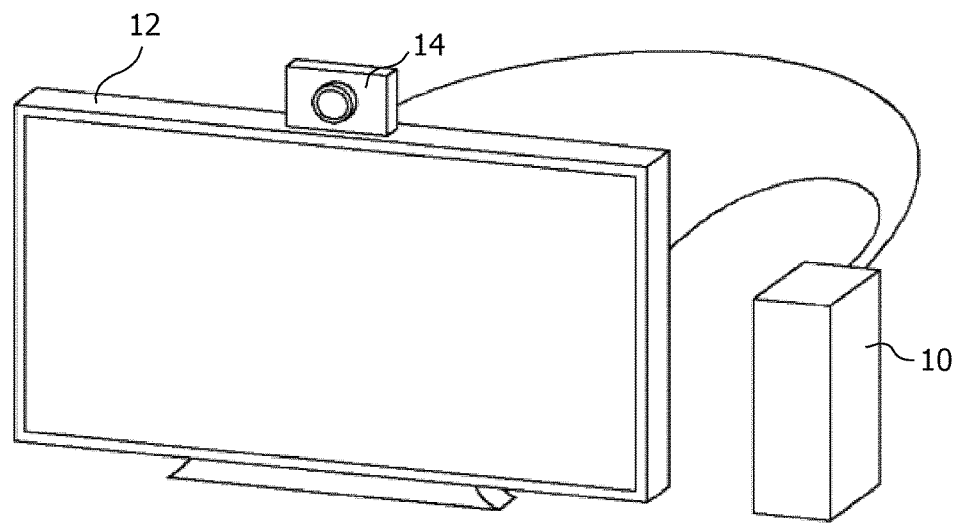
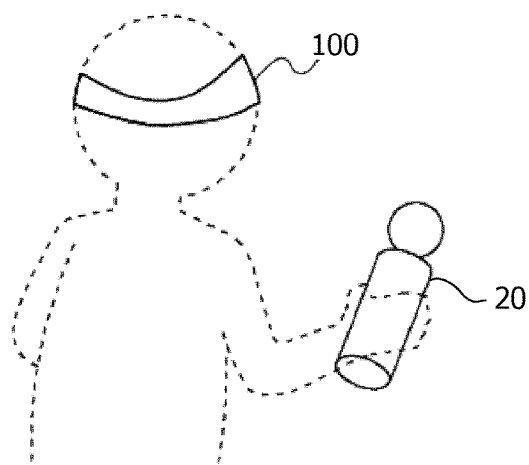

F I G . 4
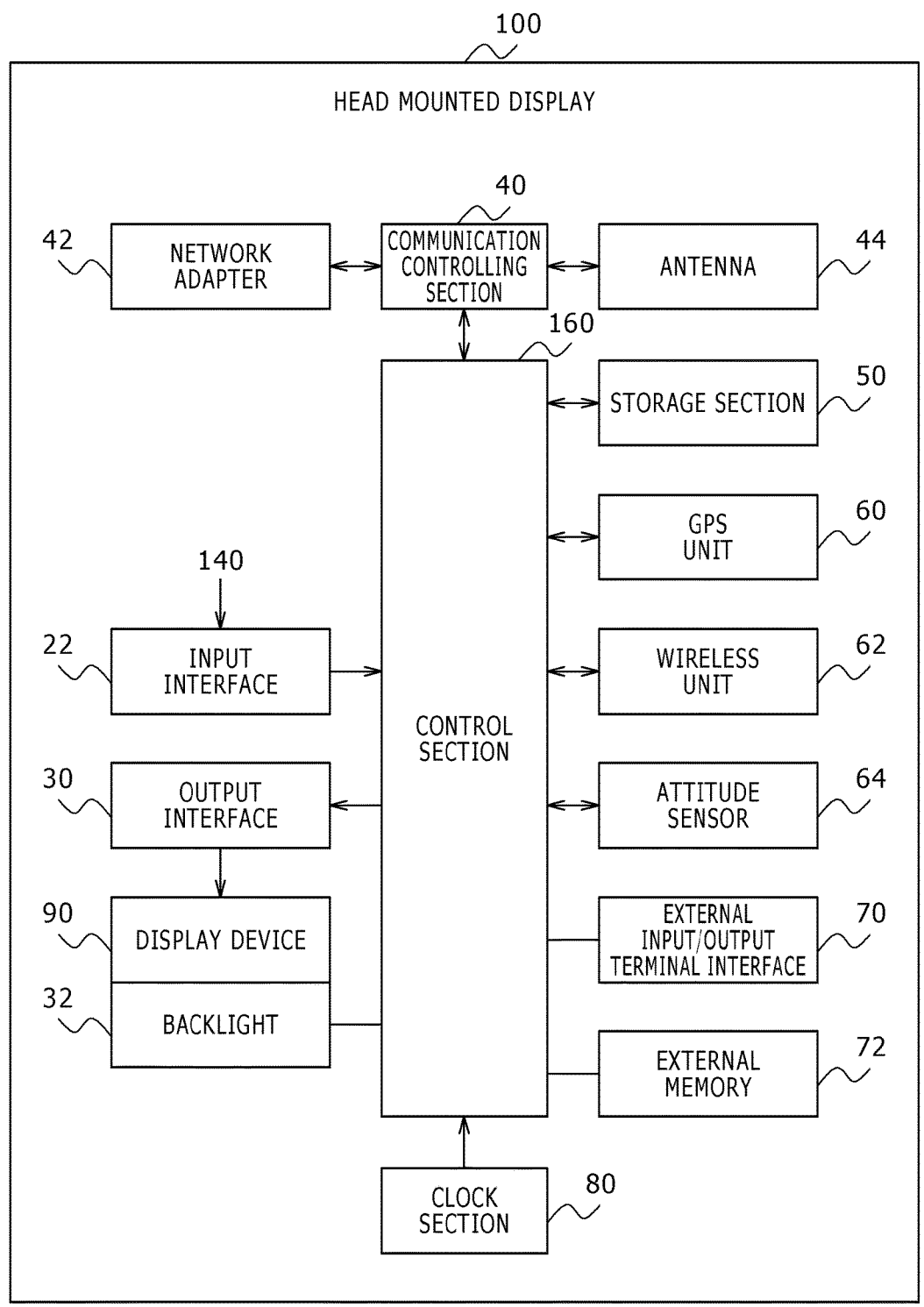

FIG.21
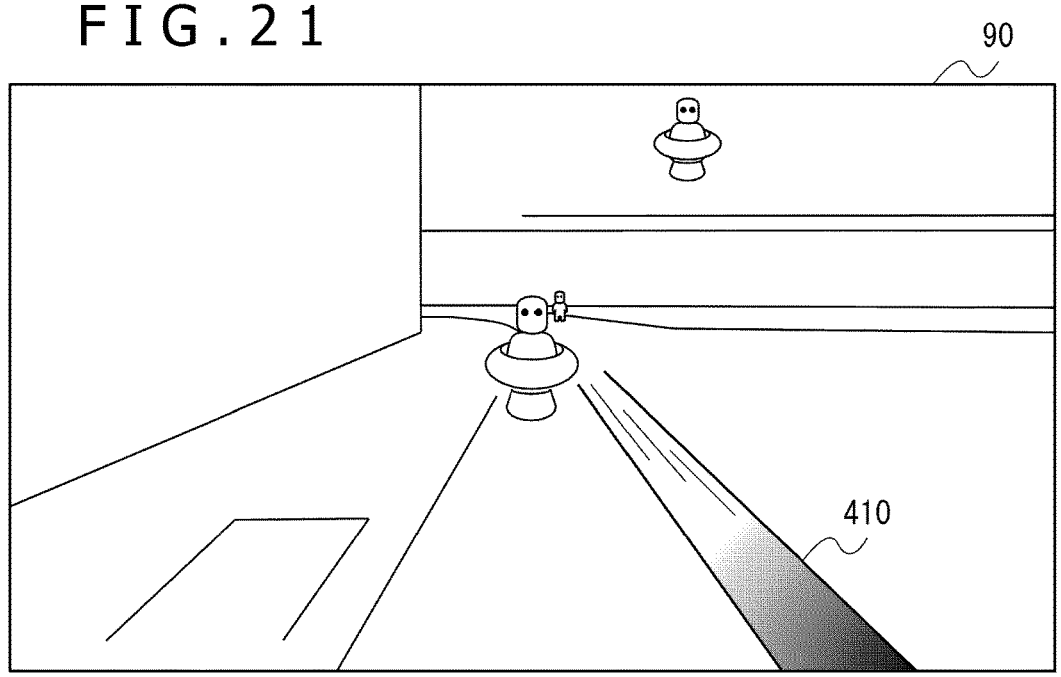
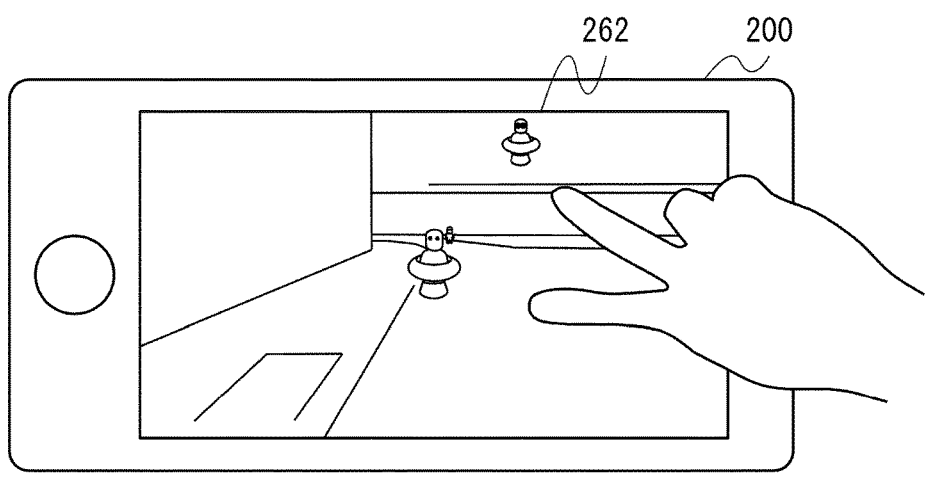
FIG.22

HEAD MOUNTED DISPLAY, MOBILE INFORMATION TERMINAL, IMAGE PROCESSING APPARATUS, DISPLAY CONTROL PROGRAM, DISPLAY CONTROL METHOD, AND DISPLAY SYSTEM

TECHNICAL FIELD

The present invention relates to display control techniques. More particularly, the invention relates to a head-mounted display, a display control program, a display control method, and a display system.

BACKGROUND ART

It has been general practice to wear on the head a head-mounted display connected to a game machine and to play games by operating typically a controller while watching a screen displayed on the head-mounted display. With an ordinary stationary display connected to the game machine, the user's field of view extends outside the display screen. This tends to prevent the user from concentrating on the display screen or from experiencing an immersive sense of the game. By contrast, wearing the head-mounted display allows the user to watch nothing but the image displayed on the screen of the head-mounted display. This enhances the sense of immersion in a visual world and boosts the entertaining nature of the game being played.

SUMMARY

Technical Problem

The inventors have come to recognize a need for more user-friendly input techniques that allow a wider demographic of users to enjoy games using the head-mounted display.

Solution to Problem

In solving the above problem and according to one embodiment of the present invention, there is provided a head-mounted display wearable on the head of a user. The head-mounted display includes: a display device configured to be disposed on an inner surface of the head-mounted display worn by the user on the head; an input device configured to be disposed on an outer surface of the head-mounted display worn by the user on the head, the input device being able to detect contact with or proximity of a body part of the user; and a display controlling unit configured to acquire data of an image generated on the basis of input information indicative of the input device detecting the contact with or the proximity of the body part of the user, the display controlling unit further causing the display device to display the acquired image data.

According to another embodiment of the present invention, there is provided a display control method including: a step of causing an acquiring unit to acquire data of an image generated based on input information indicative of an input device detecting contact with or proximity of a body part of a user wearing a head-mounted display on the head, the input device being disposed on an outer surface of the head-mounted display; and a step of causing a display controlling unit to display the image data acquired by the acquiring unit on a display device disposed on an inner surface of the head-mounted display worn by the user on the head.

According to a further embodiment of the present invention, there is provided a display system including: a head-mounted display configured to be wearable on the head of a user; and an image processing apparatus configured to generate an image to be displayed on the head-mounted display. The head-mounted display includes: a display device configured to be disposed on an inner surface of the head-mounted display worn by the user on the head; an input device configured to be disposed on an outer surface of the head-mounted display worn by the user on the head, the input device being able to detect contact with or proximity of a body part of the user; and a display controlling unit configured to acquire from the image processing apparatus data of an image generated based on input information indicative of the input device detecting the contact with or the proximity of the body part of the user, the display controlling unit further causing the display device to display the acquired image data. The image processing apparatus includes an image generating unit configured to acquire the input information and generate the image data based on the input information.

According to an even further embodiment of the present invention, there is provided a head-mounted display wearable on the head of a user. The head-mounted display includes: a display device configured to be disposed on an inner surface of the head-mounted display worn by the user on the head; and a display controlling unit configured to acquire data of an image generated based on input information indicative of an input device detecting contact with or proximity of a body part of the user wearing the head-mounted display on the head, the input device being disposed on an outer surface of the head-mounted display, the display controlling unit further causing the display device to display the acquired image data.

According to a still further embodiment of the present invention, there is provided a mobile information terminal portable by a user. The mobile information terminal includes: an input device configured to be able to detect contact with or proximity of a body part of the user; and a communication section configured to transmit input information indicative of the input device detecting the contact with or the proximity of the body part of the user wearing a head-mounted display on the head, the mobile information terminal being disposed on an outer surface of the head-mounted display worn by the user on the head, to an apparatus generating an image to be displayed on the head-mounted display based on the input information.

According to a yet further embodiment of the present invention, there is provided an image processing apparatus including: a receiving unit configured to receive input information indicative of an input device detecting contact with or proximity of a body part of a user wearing a head-mounted display on the head, the input device being disposed on an outer surface of the head-mounted display; a generating unit configured to generate data of an image based on the input information received by the receiving unit, the image being destined to be displayed on a display device disposed on an inner surface of the head-mounted display worn by the user on the head; and a transmitting unit configured to transmit to the head-mounted display the image data generated by the generating unit.

Where other combinations of the above-outlined composing elements or the above expressions of the present invention are converted between different forms such as a method, a device, and a system, they still constitute effective embodiment of this invention.

Advantageous Effect of Invention

The present invention enhances the user-friendliness of the head-mounted display.

BRIEF DESCRIPTION OF DRAWINGS

FIG. 1 is a schematic view showing the usage environment of a game system according to an embodiment.

FIG. 4 is a functional block diagram of the head-mounted display.

FIG. 21 is a schematic view showing another typical image displayed on the display device of the head-mounted display.

FIG. 22 is a schematic view showing another touch panel of the mobile information terminal.

DESCRIPTION OF EMBODIMENT

Figure 2:
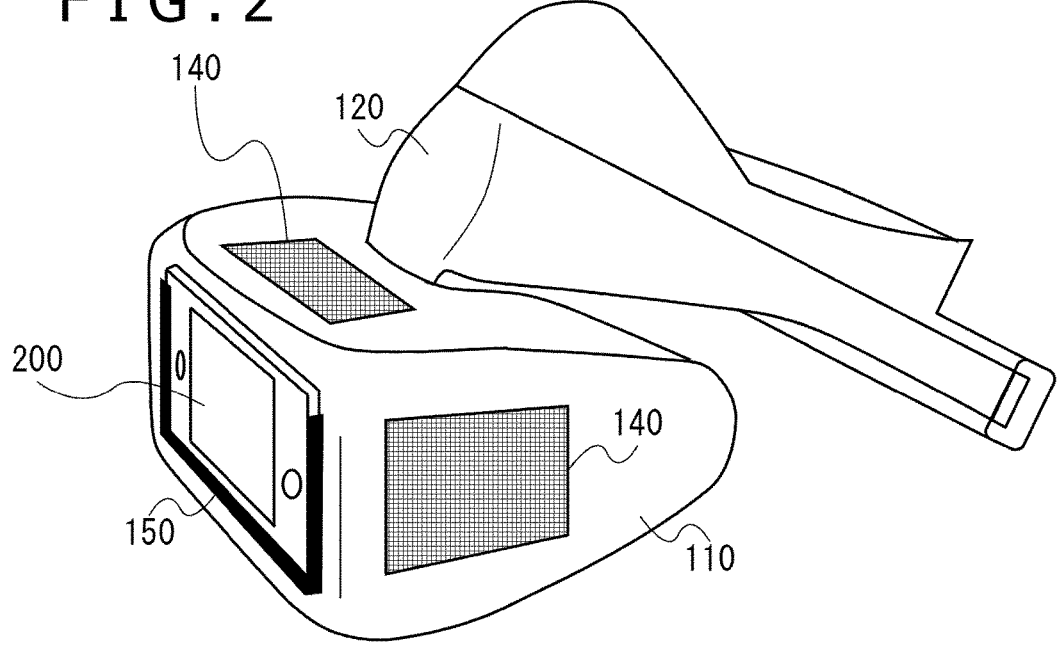
FIG. 2 is an external view of a head-mounted display according to the embodiment.

A display system that uses a head-mounted display (HMD) is described below. The head-mounted display is worn by the user on the head in a manner covering the user's both eyes to let the user visually enjoy static or moving images displayed on a display screen set up in front of the user's eyes. While the object to be displayed on the head-mounted display may be contents such as movies and television programs, the head-mounted display embodying the present invention will be explained below as a display device that displays game images.

FIG. 1 shows the usage environment of a game system 1 according to an embodiment. The game system 1 includes a game device 10 that executes game programs, an input device 20 that inputs the user's instructions to the game device 10, an imaging device 14 that captures images of a real space around the user, and a head-mounted display 100 that displays game images generated by the game device 10.

In this embodiment, an input apparatus for receiving touch input from the user is disposed on an outer surface of the head-mounted display 100 worn by the user. If a game operable only by input through this input apparatus is to be executed, the input device 20 is not needed. When wearing the head-mounted display 100, the user is unable to visually recognize the surroundings. This makes it difficult for the user, after wearing the head-mounted display 100, to look for input equipment such as the input device 20. Furthermore, the input equipment like the input device 20 being brandished can hit against obstacles in the surroundings. By contrast, this embodiment may let only the input apparatus capable of receiving touch input receive relevant input. There is thus no need to wield or look for the input device 20. As will be discussed later, the user can perform operations intuitively through an input interface that utilizes touch input. What is offered here is a user-friendly input interface that can be used easily by users not familiar with games.

When playing a game that receives operating instructions from both the above-mentioned input apparatus and the input device 20, the user may operate the input device 20 while holding it by right hand and perform input by left hand to the input apparatus disposed on an outer surface of the head-mounted display 100, as shown in FIG. 1, for example.

The game device 10 executes a game program based on the instructions input either to the input device 20 or to the input apparatus disposed on the outer surface of the head-mounted display 100. In so doing, the game device 10 generates an image signal representing the result of processing the game program and transmits the generated image signal to the head-mounted display 100.

Upon receipt of the image signal generated by the game device 10, the head-mounted display 100 displays a game image. The head-mounted display 100 also transmits to the game device 10 information about the touch input made by the user to the input apparatus disposed on the outer surface of the head-mounted display 100. The head-mounted display 100 may be connected by a cable to the game device 10. Alternatively, the head-mounted display 100 may be connected to the game device 10 wirelessly via a wireless local area network (LAN).

The game image may also be output to a display device 12. The display device 12 may be a television set having a display and speakers or a computer display, for example.

The input device 20 has the function of transmitting to the game device 10 the instructions input by the user. In this embodiment, the input device 20 is configured to be a wireless controller capable of wirelessly communicating with the game device 10. Wireless connection may be established between the input device 20 and the game device 10 using the Bluetooth (registered trademark) protocol. The input device 20 is not limited to a wireless controller. Alternatively, the input device 20 may be a wired controller connected by a cable to the game device 10.

The input device 20 is driven by battery power and has multiple buttons for giving operating instructions to make the game progress. When the user operates the buttons of the input device 20, corresponding operating instructions are transmitted wirelessly to the game device 10.

The imaging device 14 is a video camera made up of a charge-coupled device (CCD) image sensor or a complementary metal-oxide semiconductor (CMOS) image sensor, for example. The imaging device 14 captures images of the real space at predetermined intervals to generate a frame image per interval. The imaging device 14 is connected to the game device 10 via a universal serial bus (USB) or via some other suitable interface. The game device 10 uses the images captured by the imaging device 14 to determine the positions and attitudes of the input device 20 and head-mounted display 100. Alternatively, the imaging device 14 may be a ranging camera or a stereo camera capable of measuring distances. In this case, the imaging device 14 obtains the distance from the imaging device 14 to the input device 20 or to the head-mounted display 100, for example.

In the game system 1 of this embodiment, the input device 20 has a light emitter configured to emit light in multiple colors. During the game, the light emitter emitting light in the color designated by the game device 10 is captured by the imaging device 14. The imaging device 14 generates a frame image by capturing the input device 20 and supplies the generated image to the game device 10. The game device 10 acquires the frame image, and obtains position information about the light emitter in the real space on the basis of the position and size of a light emitter image in the acquired frame image. The game device 10 handles the position information as a game operating instruction and has it reflected in the processing of the game by controlling the movement of a player character, for example. The game device 10 of this embodiment has the function of processing game applications using not only the input operations performed on the buttons of the input device 20 but also the position information from the captured light emitter image.

The input device 20 further includes an acceleration sensor and a gyro sensor. Detected values of the sensors are transmitted to the game device 10 at predetermined intervals. The game device 10 obtains the sensor-detected values to acquire attitude information about the input device 20 in the real space. The game device 10 handles the attitude information as a game operating instruction and has it reflected in the processing of the game.

FIG. 2 is an external view of the head-mounted display 100 according to the embodiment. The head-mounted display 100 includes a body section 110, a head contacting section 120, touch pads 140, and a terminal mounting section 150.

A position sensor such as a global positioning system (GPS) incorporated in or externally attached to the head-mounted display 100 permits measurement of user position information. An attitude sensor incorporated in or externally attached to the head-mounted display 100 enables measurement of attitude information such as the orientation and inclination of the user's head wearing the head-mounted display 100.

The body section 110 includes a display, a position information acquisition sensor, an attitude sensor, and a communication device. The head contacting section 120 includes biological information acquisition sensors capable of measuring the user's biological information such as body temperature, pulse rate, blood components, perspiration, electroencephalography, and cerebral blood flow.

Outer surfaces of the head-mounted display 100 are equipped with an input apparatus for receiving touch input from the user. The input apparatus may be touch pads that do not double as a display apparatus and are attached beforehand to the head-mounted display 100. Alternatively, the input apparatus may double as a display apparatus. As another alternative, an external apparatus such as a smartphone having a touch pad or a touch panel serving as an input apparatus may be connected detachably to the head-mounted display 100. In this embodiment, the touch pads 140 are disposed on the upper and side surfaces of the body section 110. A mobile information terminal 200 is connected detachably to the terminal mounting section 150 disposed at the front of the body section 110.

The touch pad 140 disposed on the side surface may be operated by a suitable system such as the matrix switch system, resistive film system, surface acoustic wave system, infrared ray system, electromagnetic induction system, or electrostatic capacitance system. Alternatively, the touch pad 140 may be a contact type touch pad that detects input when the pad surface is touched by the user's fingertips, for example. As another alternative, the touch pad 140 may be a non-contact type touch pad that may sense input when the pad surface is approached by the user's fingertips, for example. The touch pad 140 may also be equipped with a touch-sensitive sensor that may detect pressing force on the pad surface. The touch pad 140 may be configured to calculate the strength of the input based on the planar dimension, voltage value, and electrostatic capacitance of a touched pad area, for example. The touch pad 140 outputs the coordinates of the position at which the input is detected.

A frontal region of the head-mounted display 100 is provided with the terminal mounting section 150 for detachably mounting the mobile information terminal 200, on which the user's mobile information terminal 200 may be detachably mounted. When the mobile information terminal 200 is mounted, it functions as an input apparatus. A display device of the mobile information terminal 200 may display images generated by the head-mounted display 100 or information about the head-mounted display 100.

The head-mounted display 100 may be further equipped with a camera for capturing the user's eyes. The camera incorporated in the head-mounted display 100 may detect the user's line of sight, pupil movements, and blinks, for example.

While this embodiment is described in conjunction with the head-mounted display 100, the display control method of the embodiment is not limited to the head-mounted display 100 in a narrowly defined sense. The display control method is also applicable to glasses, a glass type display, a glass type camera, headphones, a headset (headphones equipped with a microphone), earphones, earrings, an ear-hanging camera, a hat, a camera-equipped hat, or a hairband, each worn by the user.

Figure 3:
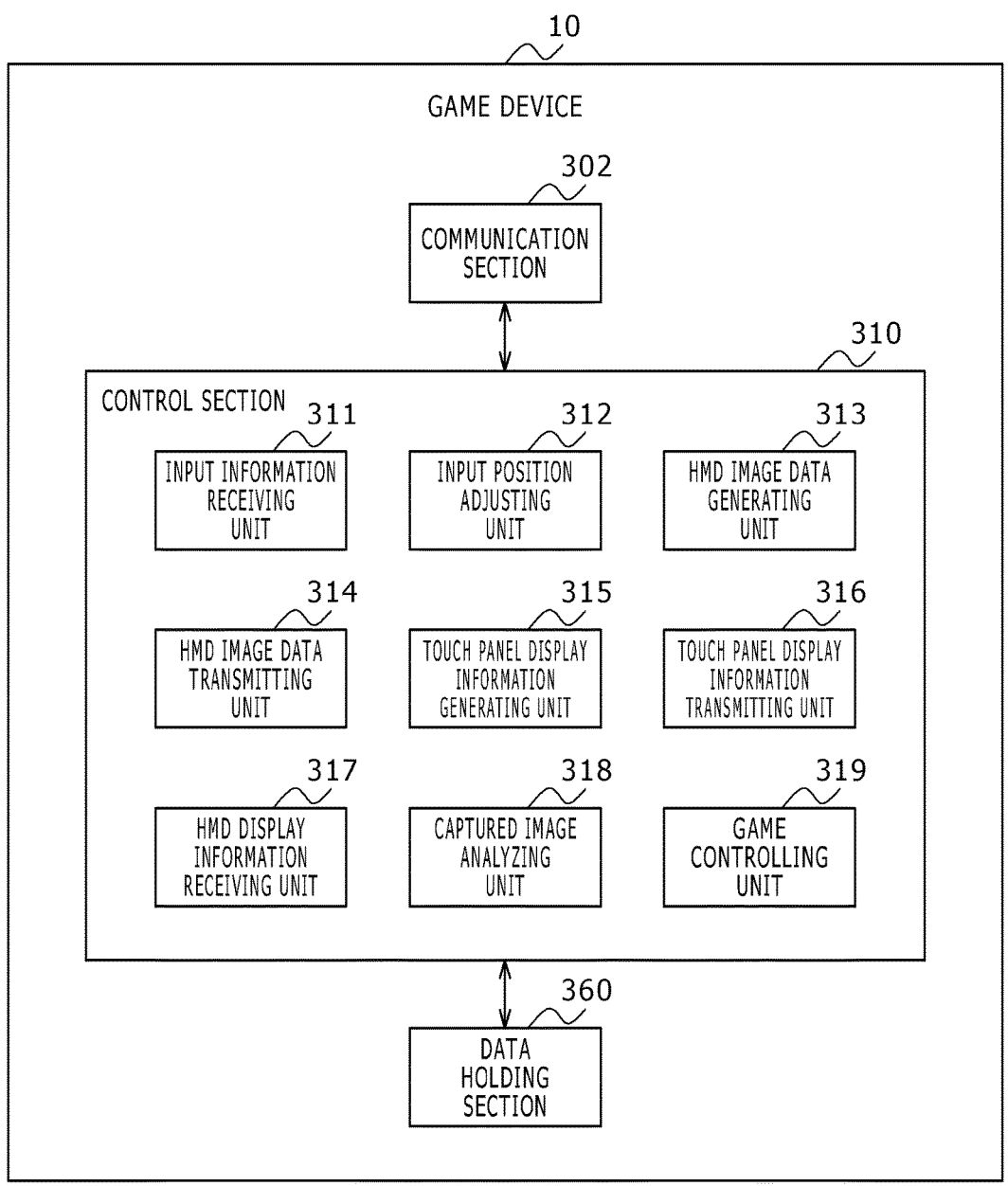
FIG. 3 is a functional block diagram of a game device.

FIG. 3 is a functional block diagram of the game device 10. The game device 10 includes a communication section 302, a control section 310, and a data holding section 360. The control section 310 includes an input information receiving unit 311, an input position adjusting unit 312, an HMD image data generating unit 313, an HMD image data transmitting unit 314, a touch panel display information generating unit 315, a touch panel display information transmitting unit 316, an HMD display information receiving unit 317, a captured image analyzing unit 318, and a game controlling unit 319.

The communication section 302 controls communications between the head-mounted display 100, mobile information terminal 200, input device 20, imaging device 14, and display device 12, for example. The data holding section 360 holds the program data of the games to be executed by the game device 10 as well as various data for use by game programs.

The input information receiving unit 311 receives from the head-mounted display 100 and from the mobile information terminal 200 the information input by the user's touch to the head-mounted display 100 and the mobile information terminal 200. The input information receiving unit 311 further receives from the head-mounted display 100 the information about the position and attitude of the head-mounted display 100. When the input device 20 is used, the input information receiving unit 311 receives from the input device 20 the information typically about the button operations performed on and accepted by the input device 20.

The input position adjusting unit 312 associates the position of the touch input in the input information received by the input information receiving unit 311 with the position in the image displayed on the head-mounted display 100. In this embodiment, the user's touch input is received from multiple touch pads 140 disposed at different locations of the head-mounted display 100 and from the touch panel of the mobile information terminal 200. This requires that the different touched areas be associated with the areas in the displayed image. The function of the input position adjusting unit 312 will be discussed later in more detail.

The game controlling unit 319 executes a game program. The game controlling unit 319 allows the game to progress in accordance with the instructions input by the user and received by the input information receiving unit 311.

The HMD image data generating unit 313 generates the image of the game controlled by the game controlling unit 319. The HMD image data transmitting unit 314 transmits to the head-mounted display 100 the image data generated by the HMD image data generating unit 313.

The touch panel display information generating unit 315 generates information which relates to the game controlled by the game controlling unit 319 and which is to be displayed on the touch panel of the mobile information terminal 200. While the user wearing the head-mounted display 100 cannot see the touch panel of the mobile information terminal 200 during the game, the touch panel can display the information destined for people around the user. The touch panel display information transmitting unit 316 transmits to the mobile information terminal 200 the display information generated by the touch panel display information generating unit 315.

The HMD display information receiving unit 317 receives from the mobile information terminal 200 the information to be displayed on the display device of the head-mounted display 100. The HMD image data generating unit 313 causes the display information received by the HMD display information receiving unit 317 to be included in the image displayed on the head-mounted display 100. In this manner, the display information transmitted from the mobile information terminal 200 is displayed on the display device of the head-mounted display 100 so that the user may view the display information during the game.

The captured image analyzing unit 318 acquires the image captured by the imaging device 14, and analyzes the captured image to calculate the positions and attitudes of the head-mounted display 100 and input device 20. The game controlling unit 319 acquires the position and attitude of the input device 20 as an instruction from the user and has it reflected in the progress of the game. On the basis of the position and attitude of the head-mounted display 100, the HMD image data generating unit 313 controls a viewpoint position and a line-of-sight direction for use in generating the game image.

FIG. 4 is a functional block diagram of the head-mounted display 100. The head-mounted display 100 includes an input interface 22, an output interface 30, a backlight 32, a communication controlling section 40, a network adapter 42, an antenna 44, a storage section 50, a GPS unit 60, a wireless unit 62, an attitude sensor 64, an external input/output terminal interface 70, an external memory 72, a clock section 80, a display device 90, touch pads 140, and a control section 160. These functional blocks are implemented variously by hardware alone, by software alone, or by suitable combinations of both.

The control section 160 is a main processor that processes signals such as the image signal and sensor signal, instructions and data, and outputs the result of the processing. The input interface 22 receives operation signals and setting signals from the touch pads 140 as well as from a touch pad controller and feeds what is received to the control section 160. The output interface 30 receives the image signal from the control section 160 and causes the display device 90 to perform display reflecting the received image signal. The backlight 32 backlights a liquid crystal display constituting the display device 90.

The communication controlling section 40 transmits to the outside the data input from the control section 160 via the network adapter 42 or antenna 44 in wired or wireless fashion. The communication controlling section 40 further outputs to the control section 160 the data received from the outside via the network adapter 42 or antenna 44 in wired or wireless fashion.

The storage section 50 stores temporarily the data, parameters, and operation signals to be processed by the control section 160.

In accordance with the operation signals from the control section 160, the GPS unit 60 receives position information from GPS satellites and feeds the received information to the control section 160. In keeping with the operation signals from the control section 160, the wireless unit 62 receives the position information from wireless base stations and feeds the received information to the control section 160.

The attitude sensor 64 detects attitude information about the body section 110 of the head-mounted display 100, such as the orientation and inclination of the body section 110. The attitude sensor 64 is composed of a suitable combination of a gyro sensor, an acceleration sensor, and an angular acceleration sensor.

The external input/output terminal interface 70 is connected to peripherals such as a USB controller. The external memory 72 is an externally connected flash memory, for example.

The clock section 80 sets time information based on the setting signals from the control section 160, and feeds time data to the control section 160.

Figure 5:
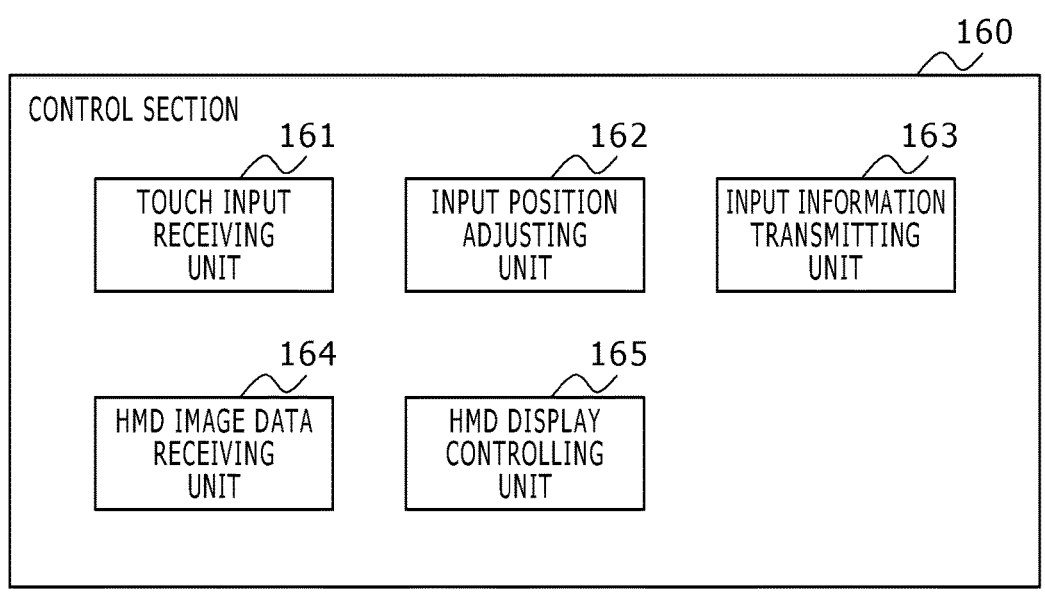
FIG. 5 is a functional block diagram of a control section of the head-mounted display.

FIG. 5 is a functional block diagram of the control section 160 of the head-mounted display 100. The control section 160 includes a touch input receiving unit 161, an input position adjusting unit 162, an input information transmitting unit 163, an HMD image data receiving unit 164, and an HMD display controlling unit 165.

The touch input receiving unit 161 receives the input signal from the touch pads 140. The input position adjusting unit 162 associates the position of the input received by the touch input receiving unit 161 with the position of the area which, as part of the image displayed on the display device 90, is assigned the input area of the touch pads 140. The input information transmitting unit 163 transmits to the game device 10 the information indicative of the touch input position adjusted by the input position adjusting unit 162.

The HMD image data receiving unit 164 receives from the game device 10 the data of the image to be displayed on the display device 90. The HMD display controlling unit 165 causes the display device 90 to display the image data received by the HMD image data receiving unit 164.

Figure 6:
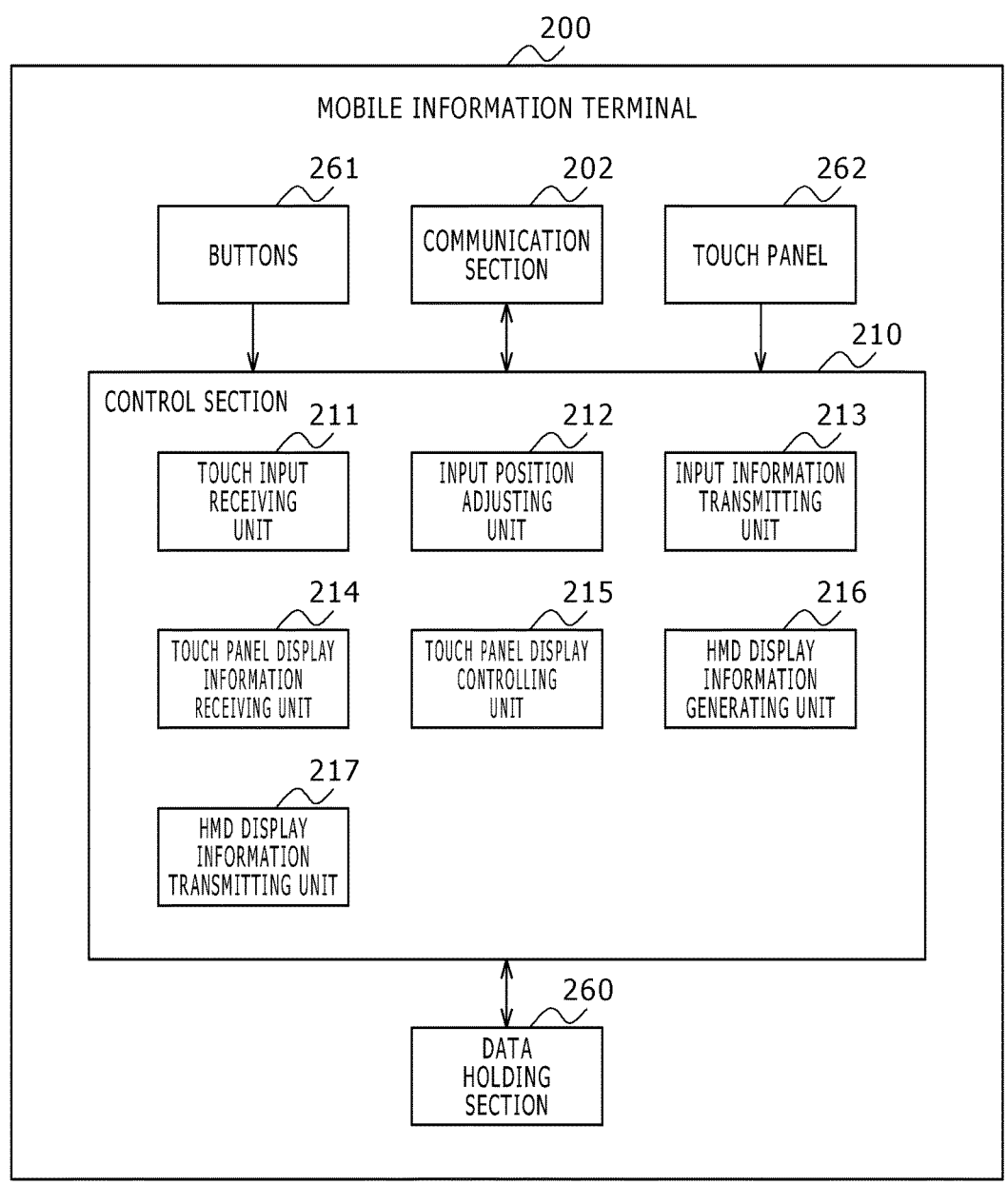
FIG. 6 is a functional block diagram of a mobile information terminal.

FIG. 6 is a functional block diagram of the mobile information terminal 200. The mobile information terminal 200 includes buttons 261, a communication section 202, a control section 210, a data holding section 260, and a touch panel 262. The control section 210 includes a touch input receiving unit 211, an input position adjusting unit 212, an input information transmitting unit 213, a touch panel display information receiving unit 214, a touch panel display controlling unit 215, an HMD display information generating unit 216, and an HMD display information transmitting unit 217. These functional blocks are also implemented variously by hardware alone, by software alone, or by suitable combinations of both.

The communication section 202 controls communications with the game device 10. The data holding section 260 holds the program data of the application executed by the mobile information terminal 200 as well as the data for use by the application. The touch panel 262 displays the image generated by the control section 210, and detects the touch input from the user.

The control section 210 executes a collaborative application for receiving the touch input to the touch panel 262 as the input to the game which is executed by the game device 10 and of which the image is displayed on the head-mounted display 100.

The touch input receiving unit 211 receives the input signal from the touch panel 262. The input position adjusting unit 212 associates the position of the input received by the touch input receiving unit 211 with the position of the area which, as part of the image displayed on the display device 90 of the head-mounted display 100, is assigned the input area of the touch panel 262. The information about the area to which the input area of the touch panel 262 is assigned is acquired from the head-mounted display 100 or from the game device 10 beforehand at the time of starting the collaborative application, for example. The input information transmitting unit 213 transmits to the game device 10 the information indicative of the touch input position adjusted by the input position adjusting unit 212.

The touch panel display information receiving unit 214 receives from the game device 10 the information to be displayed on the touch panel 262. The touch panel display controlling unit 215 causes the touch panel 262 to display the information received by the touch panel display information receiving unit 214.

The HMD display information generating unit 216 generates the information to be displayed on the display device of the head-mounted display 100. The HMD display information generating unit 216 acquires diverse notification information from other applications executed by the mobile information terminal 200, and generates display information out of the notification information in accordance with predetermined conditions. For example, when a mailing application of the mobile information terminal 200 receives a mail, the HMD display information generating unit 216 may generate the display information by extracting such information as the title of the mail, a character string made up of a predetermined number of characters at the beginning of the text of the mail, and the name of the sender. The HMD display information transmitting unit 217 transmits to the game device 10 the display information generated by the HMD display information generating unit 216. In this embodiment, the information to be displayed on the display device of the head-mounted display 100 is first transmitted to the game device 10 that in turn generates the relevant image data. In another example, the information to be displayed on the display device of the head-mounted display 100 may be directly transmitted to the head-mounted display 100. The HMD display controlling unit 165 of the head-mounted display 100 may then cause the display device 90 to display the transmitted information.

Figure 7:
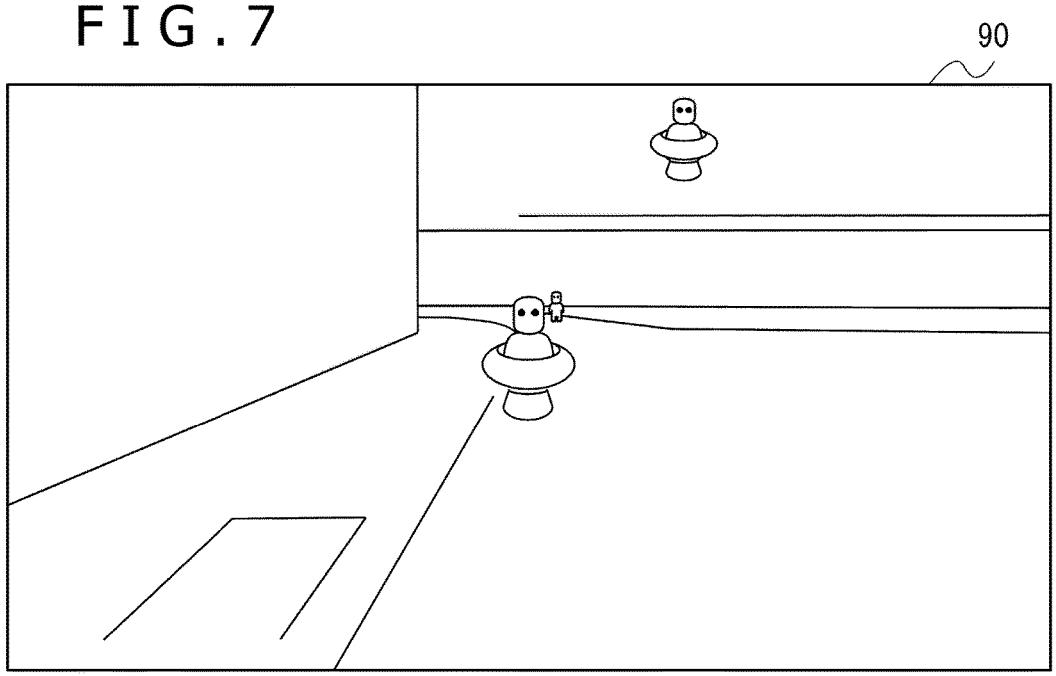
FIG. 7 is a schematic view showing a typical image displayed on a display device of the head-mounted display.

FIG. 7 shows a typical image displayed on the display device 90 of the head-mounted display 100. The display device 90 of the head-mounted display 100 displays the image of the game controlled by the game device 10.

Figure 8:
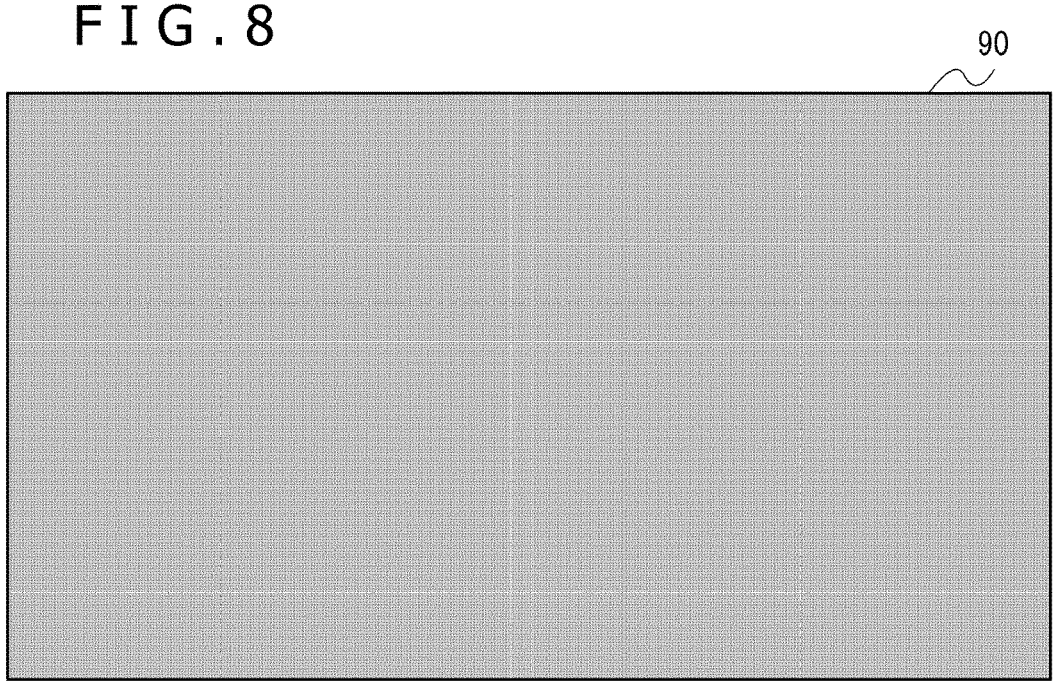
FIG. 8 is a schematic view showing another typical image displayed on the display device of the head-mounted display.

FIG. 8 shows another typical image displayed on the display device 90 of the head-mounted display 100. Suppose that while the game is being played as shown in FIG. 7, the user's surroundings are suddenly darkened. In that case, the HMD image data generating unit 313 of the game device 10 generates a pitch-dark game image. The display device 90 of the head-mounted display 100 proceeds to display the pitch-dark game image.

Figure 9:
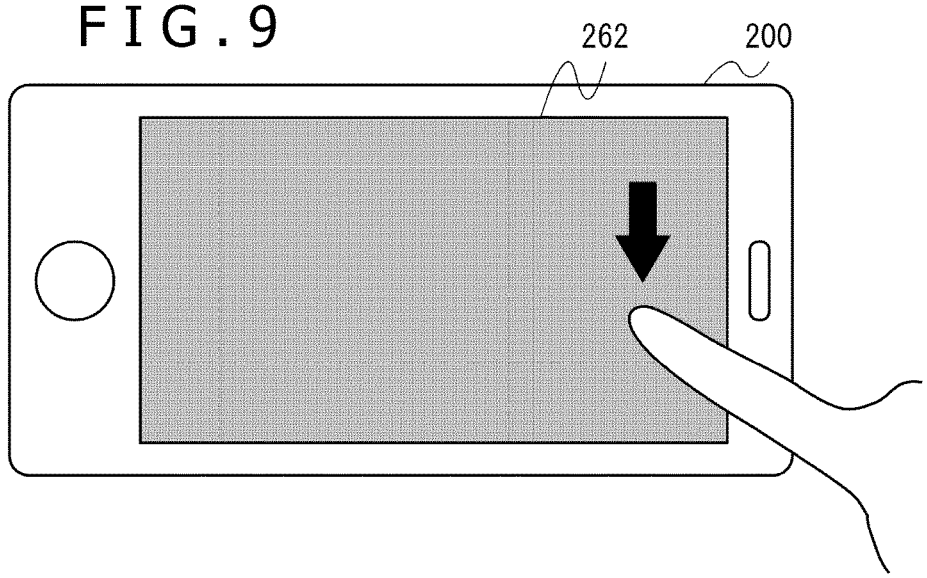
FIG. 9 is a schematic view showing a touch panel of the mobile information terminal.

FIG. 9 shows the touch panel 262 of the mobile information terminal 200. In the example of FIG. 9, the touch panel display information generating unit 315 of the game device 10 generates information for causing the touch panel 262 to display the same image as that displayed on the display device 90 of the head-mounted display 100. The touch panel display controlling unit 215 of the mobile information terminal 200 causes the touch panel 262 to display the same image as that displayed on the display device 90 of the head-mounted display 100. Suppose that there is provided a function allowing night vision goggles to be virtually worn when the touch panel 262 is flicked downward for input at any position and virtually taken off when the touch panel 262 is flicked upward for input. When the user flicks the touch panel 262 downward for input, the input information transmitting unit 213 transmits to the game device 10 information indicating that the downward flick input is made.

Figure 10:
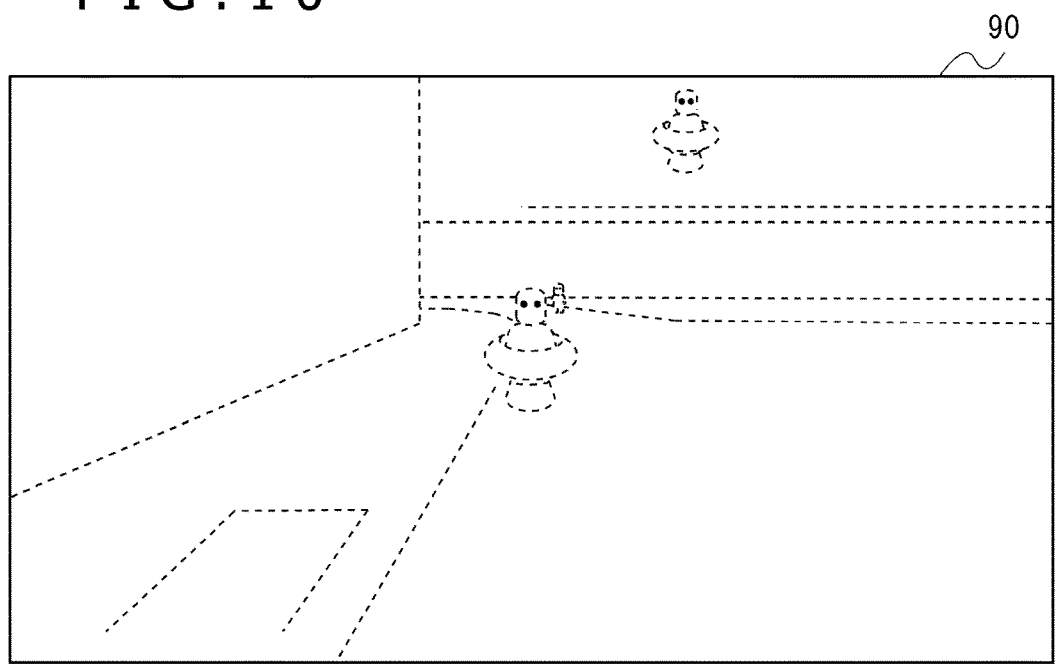
FIG. 10 is a schematic view showing another typical image displayed on the display device of the head-mounted display.

FIG. 10 shows another typical image displayed on the display device 90 of the head-mounted display 100. When the user flicks the touch panel 262 downward for input as shown in FIG. 9 and when the game controlling unit 319 of the game device 10 acquires information indicating that the downward flick input is made to the touch panel 262, the game controlling unit 319 instructs the HMD image data generating unit 313 to generate a night vision image by assuming that night vision goggles are virtually worn. The HMD image data generating unit 313 generates the night vision image that is displayed on the display device 90 of the head-mounted display 100 as shown in FIG. 10. In this manner, the downward flick input and the upward flick input made to the touch panel 262 are associated with actual goggles being worn in a downward motion and taken off in an upward motion by the user. This provides an intuitively comprehensible, user-friendly operating scheme.

Figure 11:
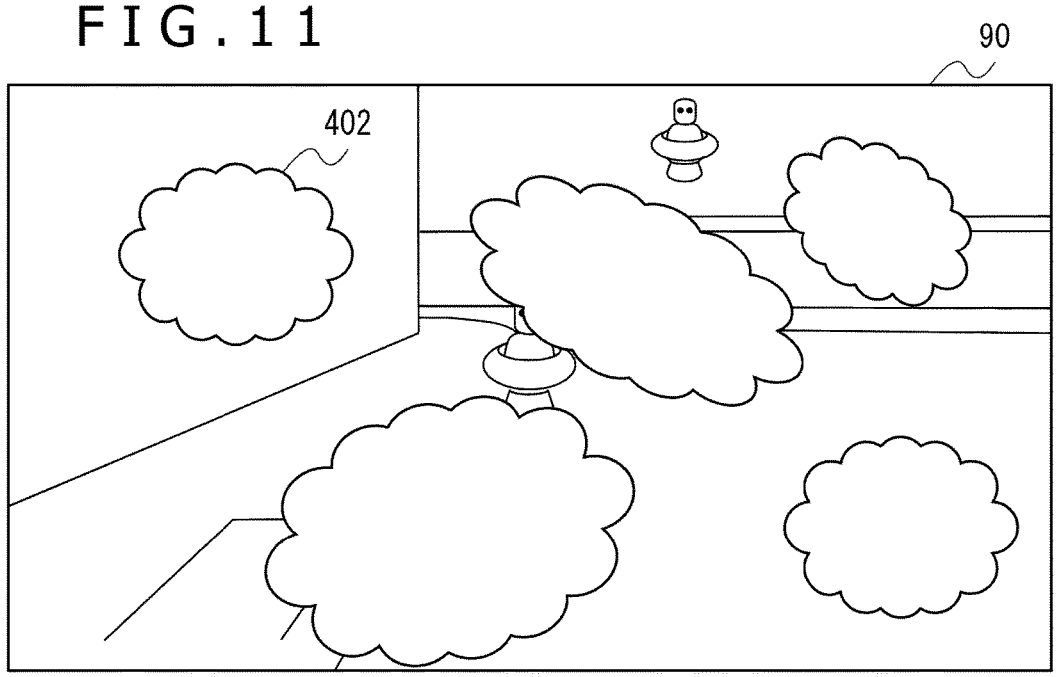
FIG. 11 is a schematic view showing another typical image displayed on the display device of the head-mounted display.

FIG. 11 shows another typical image displayed on the display device 90 of the head-mounted display 100. The display device 90 of the head-mounted display 100 displays a game image that includes clouds 402 in the field of view.

Figure 12:
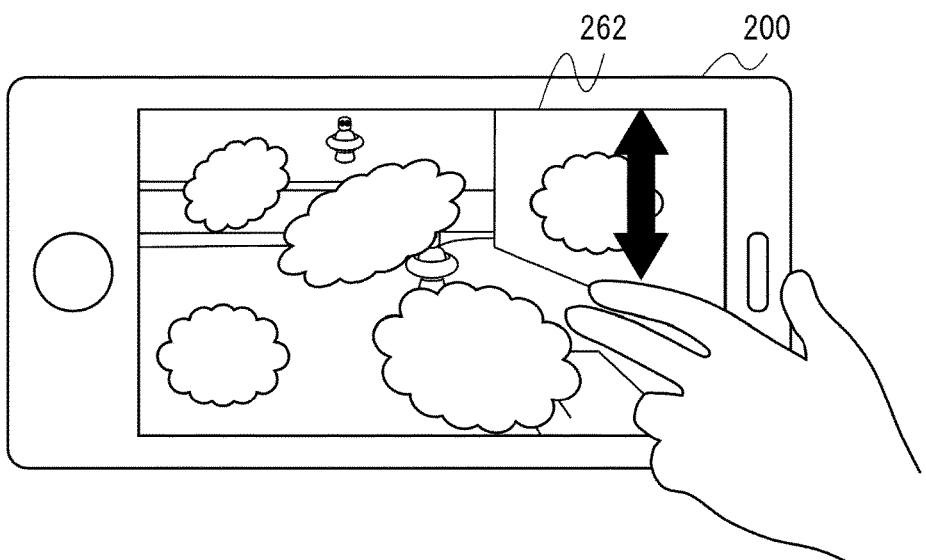
FIG. 12 is a schematic view showing another touch panel of the mobile information terminal.

FIG. 12 shows another touch panel 262 of the mobile information terminal 200. Suppose that there is provided a function for removing each cloud 402 when the position on the touch panel 262 at which the cloud 402 is displayed is swiped in any direction for input. When the user swipes the touch panel 262 for input, the input information transmitting unit 213 transmits the information indicating the swiped position to the game device 10.

Figure 13:
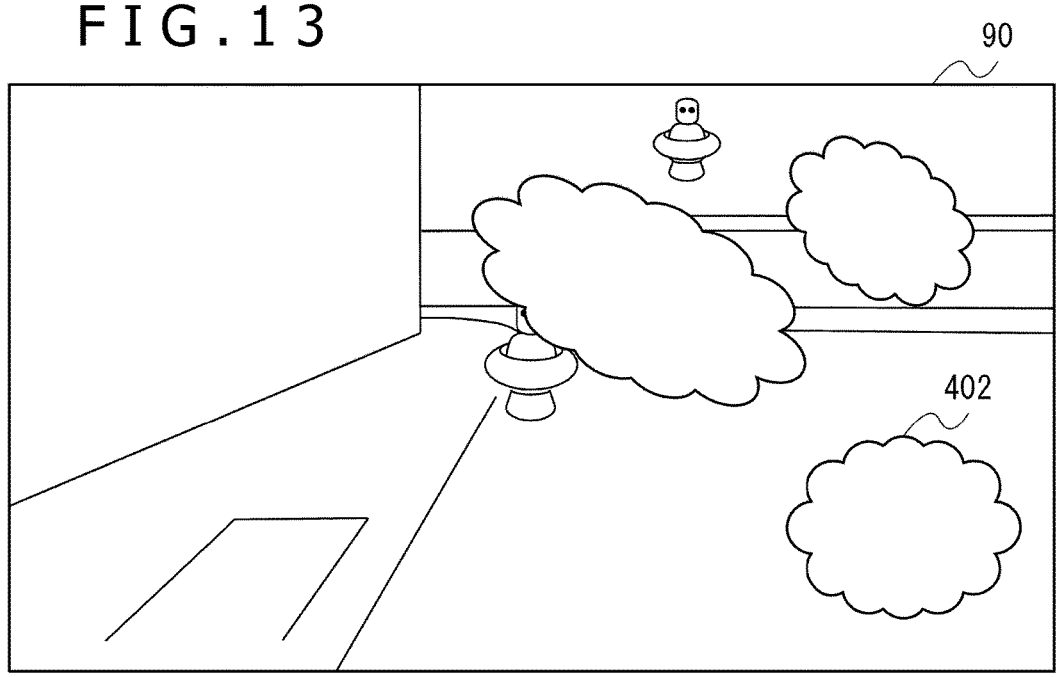
FIG. 13 is a schematic view showing another typical image displayed on the display device of the head-mounted display.

FIG. 13 shows another typical image displayed on the display device 90 of the head-mounted display 100. When the user swipes the touch panel 262 for input as shown in FIG. 12, the game controlling unit 319 of the game device 10 removes the cloud 402 displayed at the swiped position. The HMD image data generating unit 313 deletes from the game image the removed cloud 402 as shown in FIG. 13. While in FIG. 12 the user swipes a right area in the game image displayed on the touch panel 262, the swiped area corresponds to a left area on the screen as viewed from the user. The game controlling unit 319 thus deletes the cloud 402 displayed in the left area of the game image. If the touch panel 262 displays the same game image as that displayed on the head-mounted display 100, people watching the touch panel 262 see the user swipe the right area of the image but will notice that the cloud 402 displayed in the left area of the game image is deleted. This will give the watching people a feeling of awkwardness. For this reason, the touch panel 262 displays a mirror image horizontally flipping the game image displayed on the head-mounted display 100.

Figure 14:
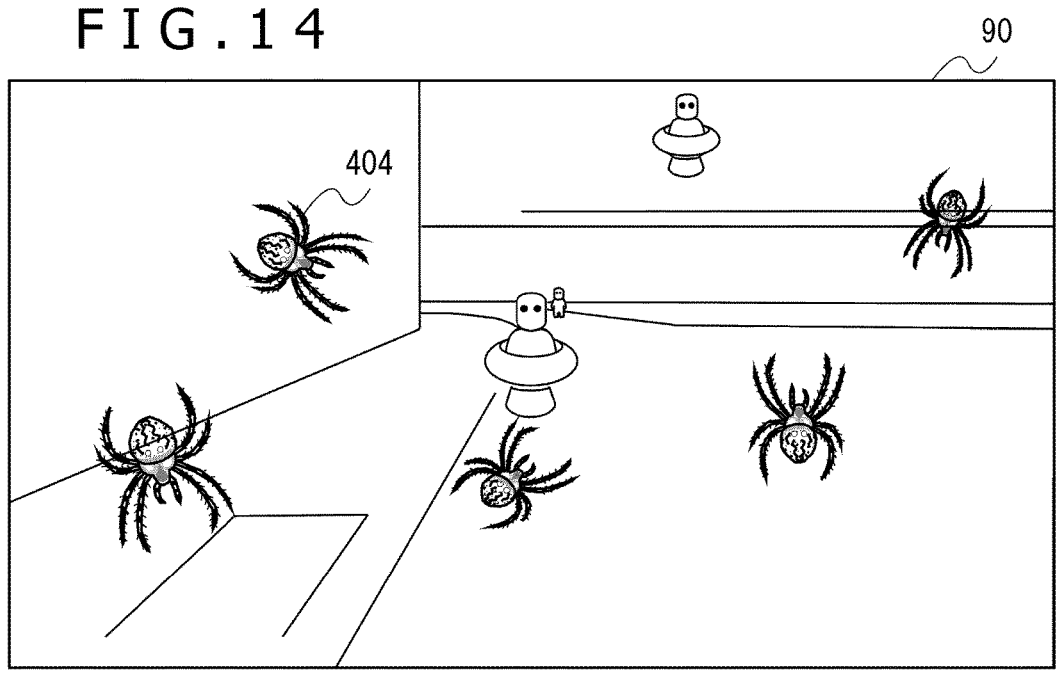
FIG. 14 is a schematic view showing another typical image displayed on the display device of the head-mounted display.

FIG. 14 shows another typical image displayed on the display device 90 of the head-mounted display 100. The display device 90 of the head-mounted display 100 displays a game image showing spiders 404 clinging to the field of view.

Figure 15:
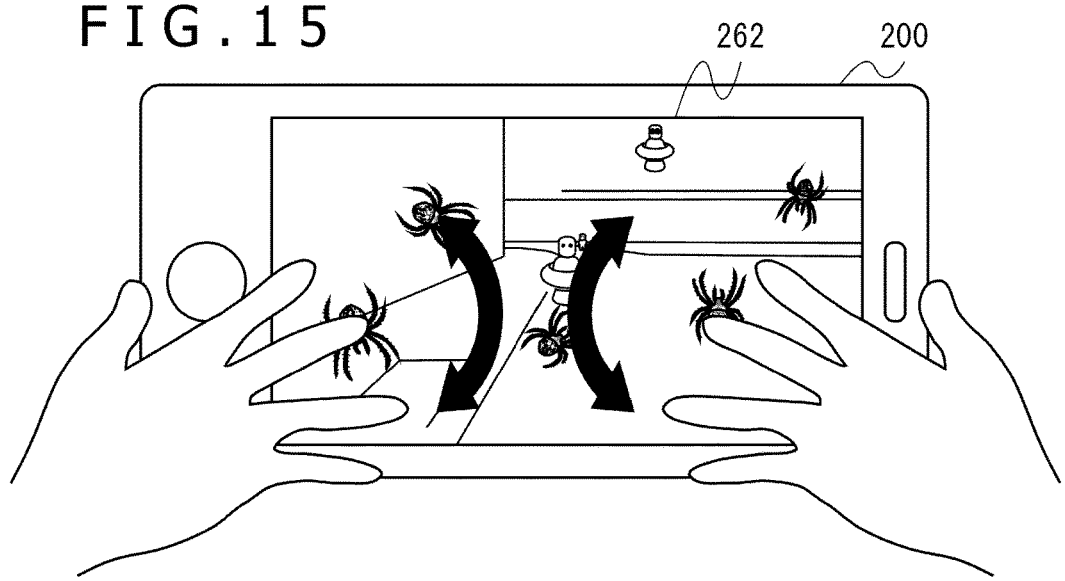
FIG. 15 is a schematic view showing another touch panel of the mobile information terminal.

FIG. 15 shows another touch panel 262 of the mobile information terminal 200. It is assumed that there is provided a function for removing the spiders 404 from any position swiped repeatedly in any direction for input on the touch panel 262. When the user swipes the touch panel 262 for input at least a predetermined number of times, the input information transmitting unit 213 transmits to the game device 10 the information indicating the swiped position and the number of times the position is swiped. In another example, every time the touch panel 262 is swiped for input, the input information transmitting unit 213 may transmit the information indicative of the swiped position to the game device 10. The game controlling unit 319 of the game device 10 may then determine whether or not the user has swiped for input at least a predetermined number of times.

Figure 16:
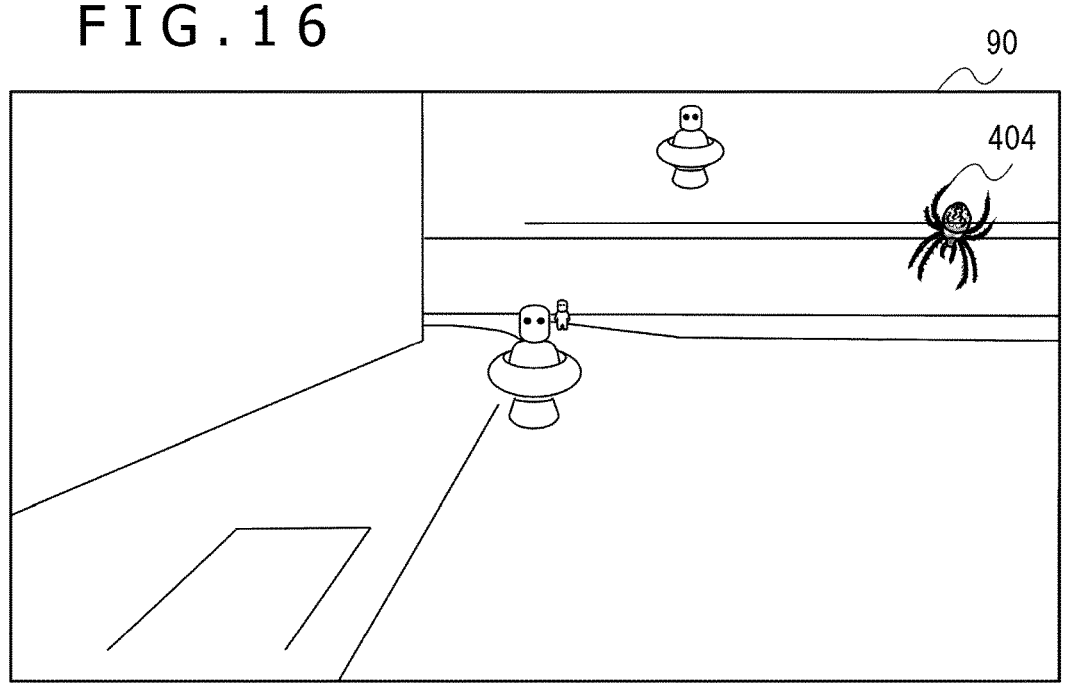
FIG. 16 is a schematic view showing another typical image displayed on the display device of the head-mounted display.

FIG. 16 shows another typical image displayed on the display device 90 of the head-mounted display 100. When the user swipes the touch panel 262 for input at least a predetermined number of times as shown in FIG. 15, the game controlling unit 319 of the game device 10 removes the spider 404 displayed on the location swiped for input at least the predetermined number of times. The HMD image data generating unit 313 deletes from the game image the removed spider 404 as shown in FIG. 16.

Figure 17:
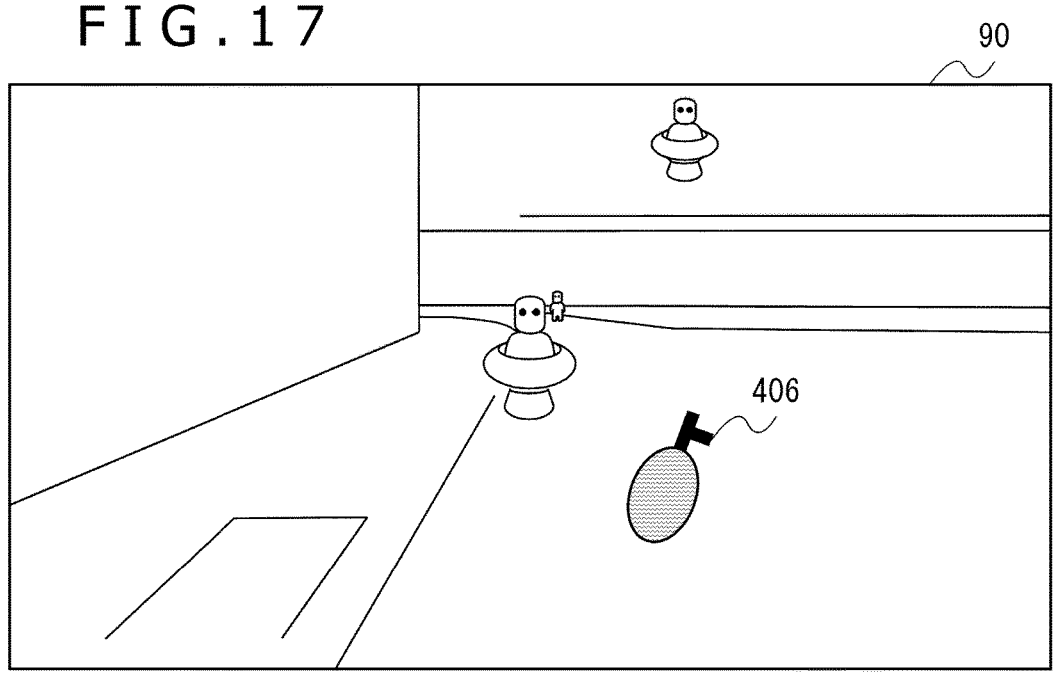
FIG. 17 is a schematic view showing another typical image displayed on the display device of the head-mounted display.

FIG. 17 shows another typical image displayed on the display device 90 of the head-mounted display 100. The display device 90 of the head-mounted display 100 displays a game image showing a flash bang grenade 406 placed in the game field.

Figure 18:
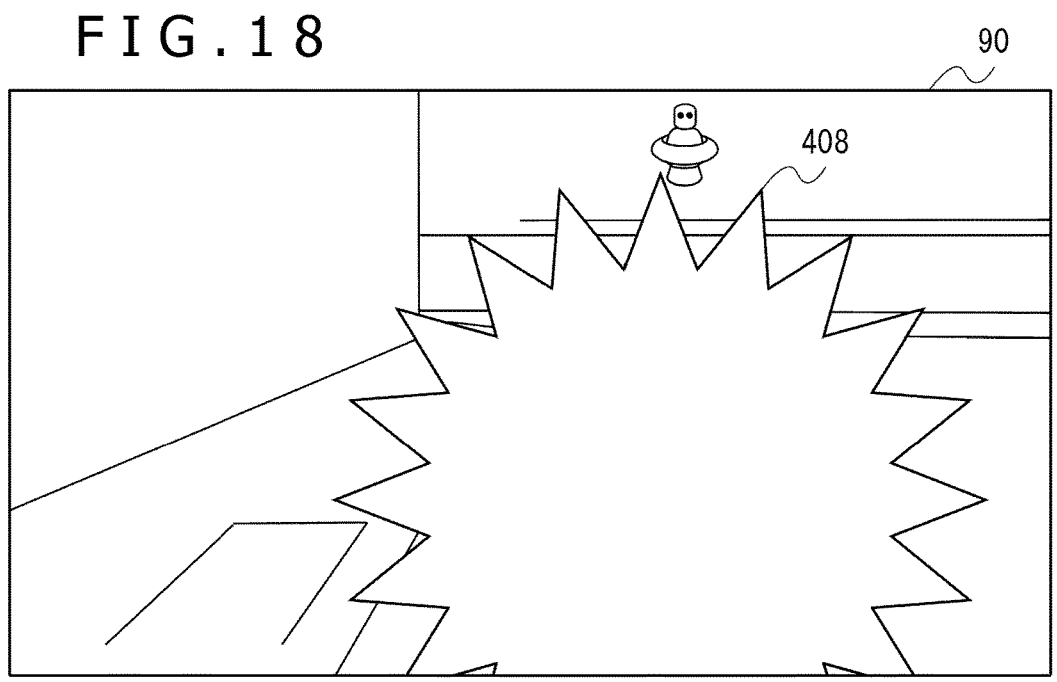
FIG. 18 is a schematic view showing another typical image displayed on the display device of the head-mounted display.

FIG. 18 shows another typical image displayed on the display device 90 of the head-mounted display 100. When predetermined conditions are met for the flash bang grenade 406 to explode in the game status shown in FIG. 17, the game controlling unit 319 causes the flash bang grenade 406 to explode. The HMD image data generating unit 313 generates a game image in which a flash is produced by explosion of the flash bang grenade 406. A flash 408 is displayed on the display device 90 of the head-mounted display 100.

When the flash 408 occurs, the user may touch the touch panel 262 in a manner covering both eyes by hand. This causes the flash 408 to disappear and the surrounding game field to be again displayed. If the user fails to touch the touch panel 262 in the manner covering both eyes by hand, the eyes are blinded by the flash 408, and a stark white game image is displayed for a predetermined time period after the flash 408 disappears, causing the surrounding game field to disappear during that period.

Figure 19:
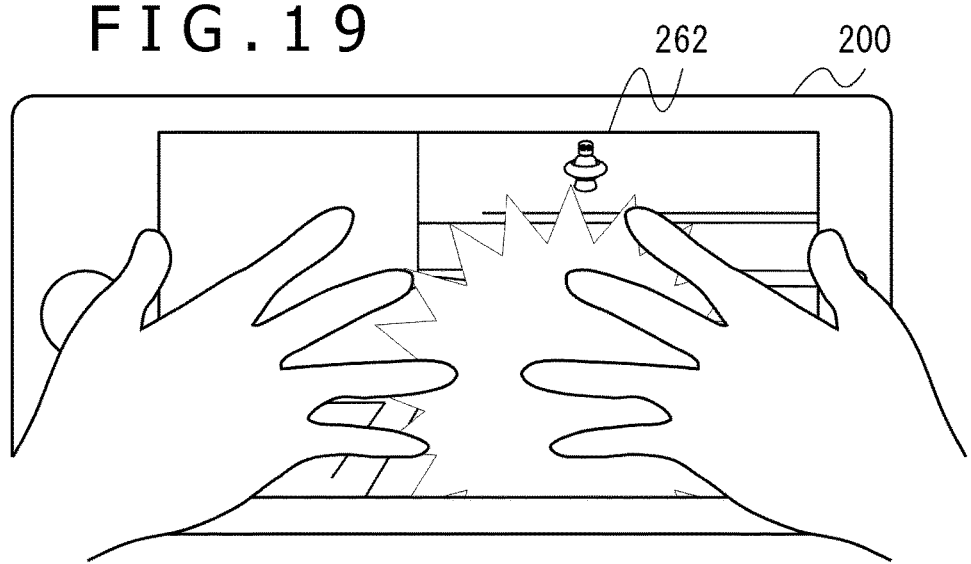
FIG. 19 is a schematic view showing another touch panel of the mobile information terminal.

FIG. 19 shows another touch panel 262 of the mobile information terminal 200. There is provided a function for shielding both eyes against the flash 408 when the user's palms touch each of a right-half area and a left-half area of the touch panel 262. When the touch panel 262 is thus touched for input, the input information transmitting unit 213 transmits information indicative of the multiple touched positions to the game device 10. The game controlling unit 319 determines whether or not the predetermined condition is met, i.e., whether or not the right-half area and the left-half area of the touch panel 262 are touched by the palms at the moment of explosion. If it is determined that the two areas of the touch panel 262 are touched for input, the game controlling unit 319 causes the HMD image data generating unit 313 to again display the surrounding game field when the flash 408 disappears. If it is determined that the two areas are not touched for input, the game controlling unit 319 causes the HMD image data generating unit 313 to display a stark white game image for a predetermined time period after the flash 408 disappears.

Figure 20:
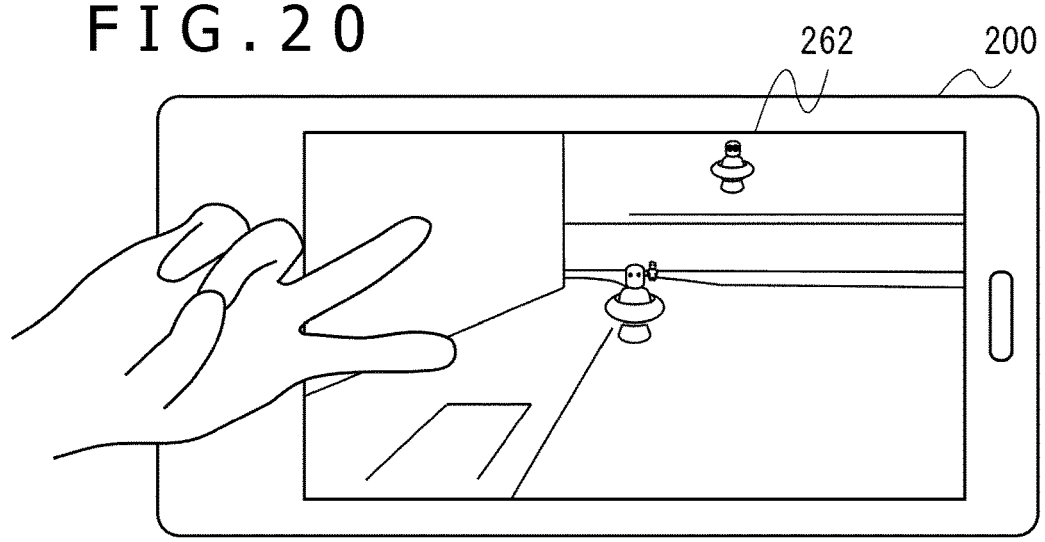
FIG. 20 is a schematic view showing another touch panel of the mobile information terminal.

FIG. 20 shows another touch panel 262 of the mobile information terminal 200. When the user forms a V sign with the index and middle fingers near either of the left and right eyes and touches the touch panel 262 with the two fingers as shown in FIG. 20, a beam is emitted from the eyes of a player's character operated by the user or from the virtual eyes of the user in a first-person point-of-view game.

FIG. 21 shows another typical image displayed on the display device 90 of the head-mounted display 100. There is provided a function for emitting a beam when two points in an area in a predetermined range of the touch panel 262 are touched simultaneously for input. When the touch panel 262 is thus touched for input, the input information transmitting unit 213 transmits information indicative of the multiple touched positions to the game device 10. The game controlling unit 319 determines whether or not two points are simultaneously touched for input inside a predetermined range of the panel. If it is determined that the two points within the predetermined rage are simultaneously touched for input, the game controlling unit 319 causes the HMD image data generating unit 313 to display a beam 410 being emitted. If it is determined that the two points are not touched for input, the game controlling unit 319 does not let the HMD image data generating unit 313 display the emission of the beam 410. When the beam 410 is emitted, the game controlling unit 319 calculates the path of the beam 410. If any object is found on the path, the game controlling unit 319 performs a process that applies to when the beam 410 hits the object.

FIG. 22 is a schematic view showing another touch panel 262 of the mobile information terminal 200. When the user touches any position for input on the touch panel 262 with the fingers for at least a predetermined time period as shown in FIG. 22, finger images are displayed on the touched positions in the game image shown on the display device 90 of the head-mounted display 100.

Figure 23:
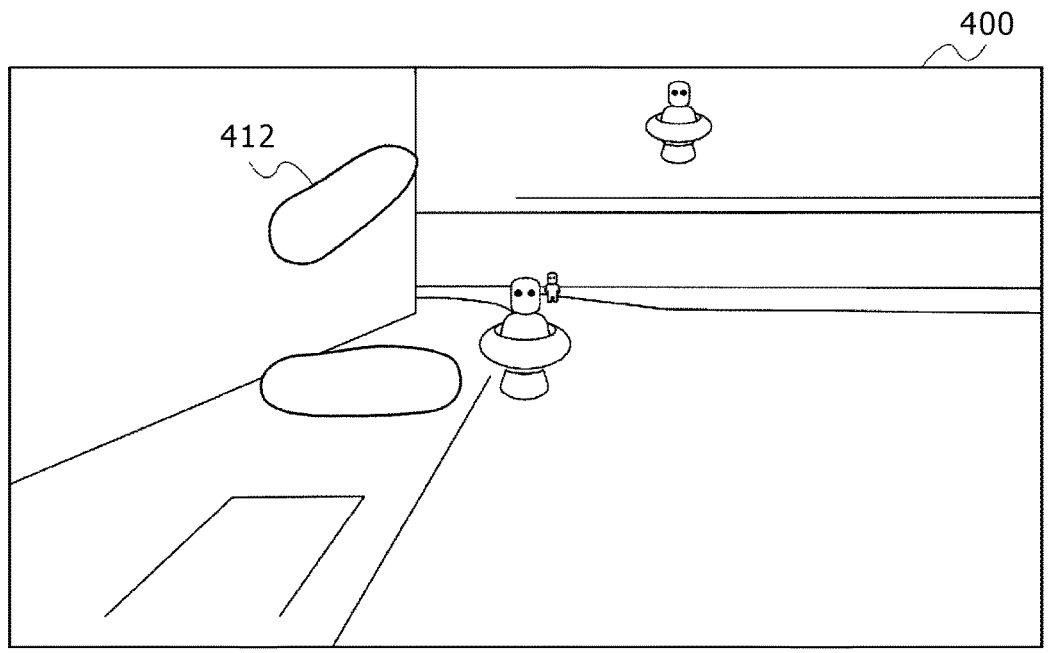
FIG. 23 is a schematic view showing another typical image displayed on the display device of the head-mounted display.

FIG. 23 shows another typical image displayed on the display device 90 of the head-mounted display 100. There is provided a function which, when the user touches any position for input on the touch panel 262 for at least a predetermined time period or with at least a predetermined amount of pressure, then gives the visual effect of letting the user's fingers intrude from the background into a virtual world image displayed on the display device 90 of the head-mounted display 100. When the touch panel 262 is touched for input, the input information transmitting unit 213 transmits to the game device 10 the information indicative of the multiple touched positions and the time spent in touching the positions or the pressure applied to the touch. The game controlling unit 319 determines whether or not the touch panel 262 is touched for at least a predetermined time period or with at least a predetermined amount of pressure. If it is determined that the touch is thus performed for input, the game controlling unit 319 causes the HMD image data generating unit 313 to display the user's fingers 412 at the touched positions. If it is determined that the touch is not performed in this manner, the game controlling unit 319 does not let the HMD image data generating unit 313 display the user's fingers 412. Alternatively, the longer the touch is performed or the larger the amount of pressure the touch is performed with, the further the fingers may be shown intruding into the foreground.

As described above, when the user performs input to the touch panel 262 in a manner corresponding to the actions by hand near the user's head in the real world, the results supposedly caused by the real-world actions are reflected in the display. This provides an intuitively comprehensible, user-friendly interface.

In the above example, the touch panel 262 of the mobile information terminal 200 displays the same image as that displayed on the display device 90 of the head-mounted display 100. This allows the people around the user concurrently to watch and enjoy the game being played by the user. This scheme is effective when parents wish to check the game played by their child, for example. Furthermore, because the game image need not to be displayed on the display device 12 for the people around the user to watch the game, the display device 12 may be used for other purposes.

The touch panel 262 may display an image different from the image displayed on the display device 90. What to display on the touch panel 262 may be determined by receiving the user's instructions via the head-mounted display 100, mobile information terminal 200, or game device 10, or determined automatically by the head-mounted display 100, mobile information terminal 200, or game device 10.

Figure 24:
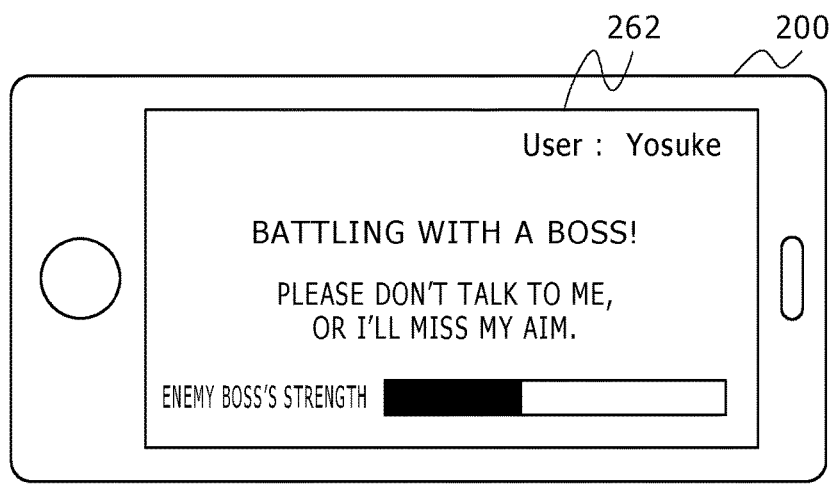
FIG. 24 is a schematic view showing a typical image displayed on the touch panel of the mobile information terminal.

FIG. 24 shows a typical image displayed on the touch panel 262 of the mobile information terminal 200. In the example of FIG. 24, the information indicating the status of the game controlled by the game controlling unit 319 is displayed on the touch panel 262. The touch panel display information generating unit 315 of the game device 10 generates the display information by acquiring the information indicative of the game status under control of the game controlling unit 319. The touch panel 262 in this example displays the game status as "battling with a boss," along with an indicator of the enemy character's strength as detailed information added to the game status and the user's message destined for the surrounding people.

Figure 25:
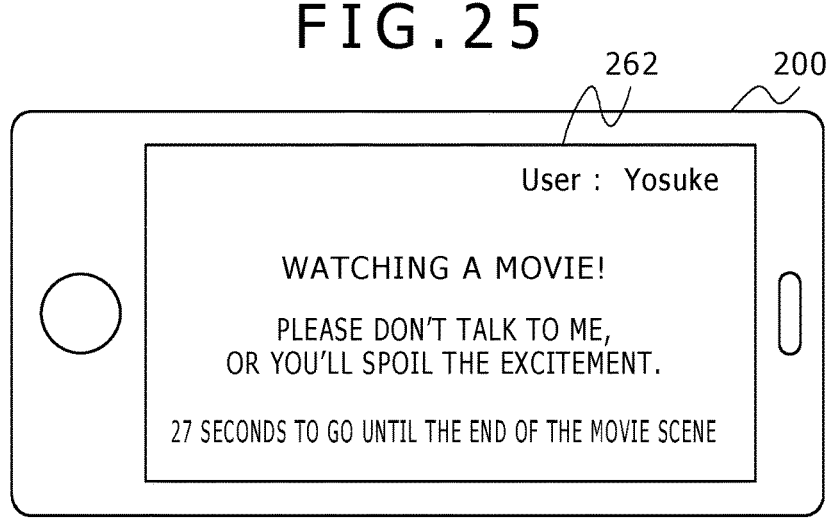
FIG. 25 is a schematic view showing another typical image displayed on the touch panel of the mobile information terminal.

FIG. 25 shows another typical image displayed on the touch panel 262 of the mobile information terminal 200. Also in the example of FIG. 25, the touch panel 262 displays the information indicative of the status of the game controlled by the game controlling unit 319. The touch panel display information generating unit 315 of the game device 10 generates the display information by acquiring the information indicative of the game status under control of the game controlling unit 319. The touch panel 262 displays the game status as "watching a movie," along with an indicator of the remaining time of the movie in seconds as detailed information added to the game status and the user's message destined for the surrounding people.

Figure 26:
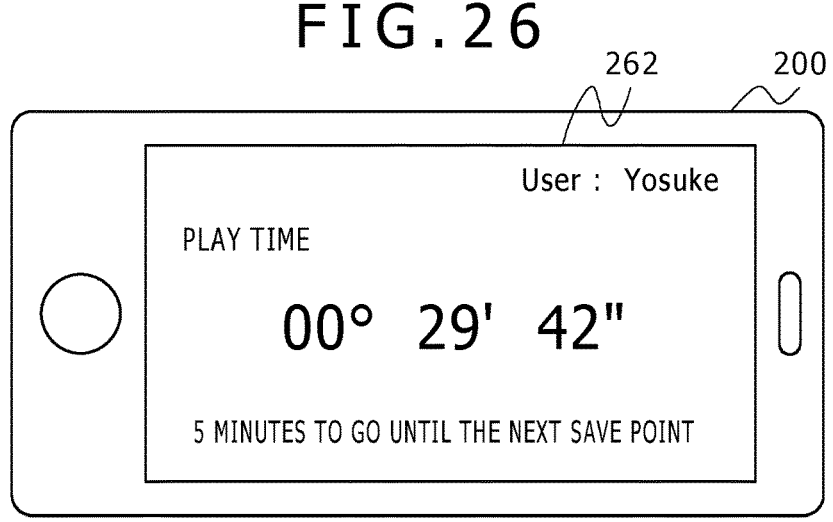
FIG. 26 is a schematic view showing another typical image displayed on the touch panel of the mobile information terminal.

FIG. 26 shows another typical image displayed on the touch panel 262 of the mobile information terminal 200. Also in the example of FIG. 25, the touch panel 262 displays the information indicative of the status of the game controlled by the game controlling unit 319. The touch panel display information generating unit 315 of the game device 10 generates the display information by acquiring the information indicative of the game status under control of the game controlling unit 319. The touch panel 262 displays the play time of the game and an approximate time required for the next save point to be reached. This feature is effective where parents wish to limit their child's play time, for example.

As described above, the touch panel 262 displays information indicating the status of the game being played or the movie being watched by the user wearing the head-mounted display 100. The feature allows the people around the user to become aware of the user's status so that they can, for example, talk to the user when the status is interruptible. This reduces the occasions where the user is interrupted even though the interruption is unwanted, thereby allowing the user to experience the sense of immersion more effectively.

Figure 27:
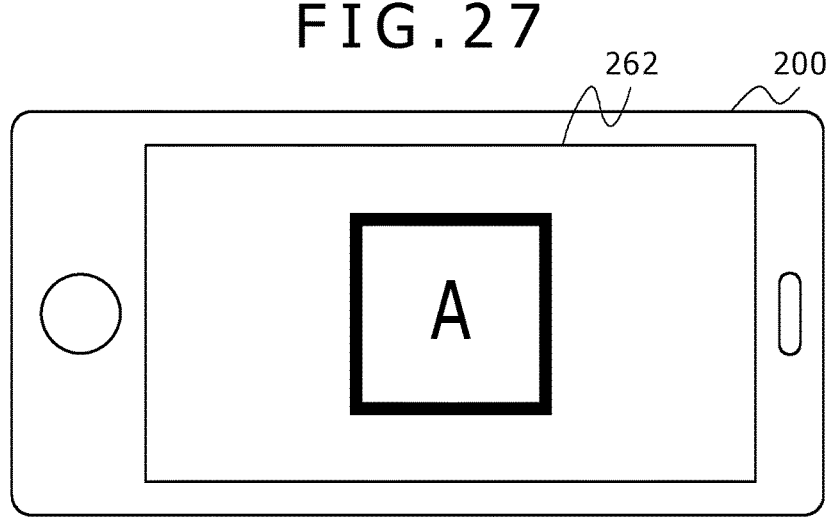
FIG. 27 is a schematic view showing another typical image displayed on the touch panel of the mobile information terminal.

FIG. 27 shows another typical image displayed on the touch panel 262 of the mobile information terminal 200. In the example of FIG. 27, the touch panel 262 displays an image serving as a marker used by the captured image analyzing unit 318 to analyze the position and attitude of the head-mounted display 100. This feature helps improve the accuracy in analyzing the position and attitude of the head-mounted display 100. The feature is more effective if different markers are displayed on multiple touch panels set up at different locations. The image serving as the marker displayed on the touch panel 262 may be any figure such as a barcode or a game character. As another alternative, the marker image may be the human eyes and their surroundings in a person's or a game character's face displayed as if the user is wearing the character's mask. This will entertain the people around the user.

Figure 28:
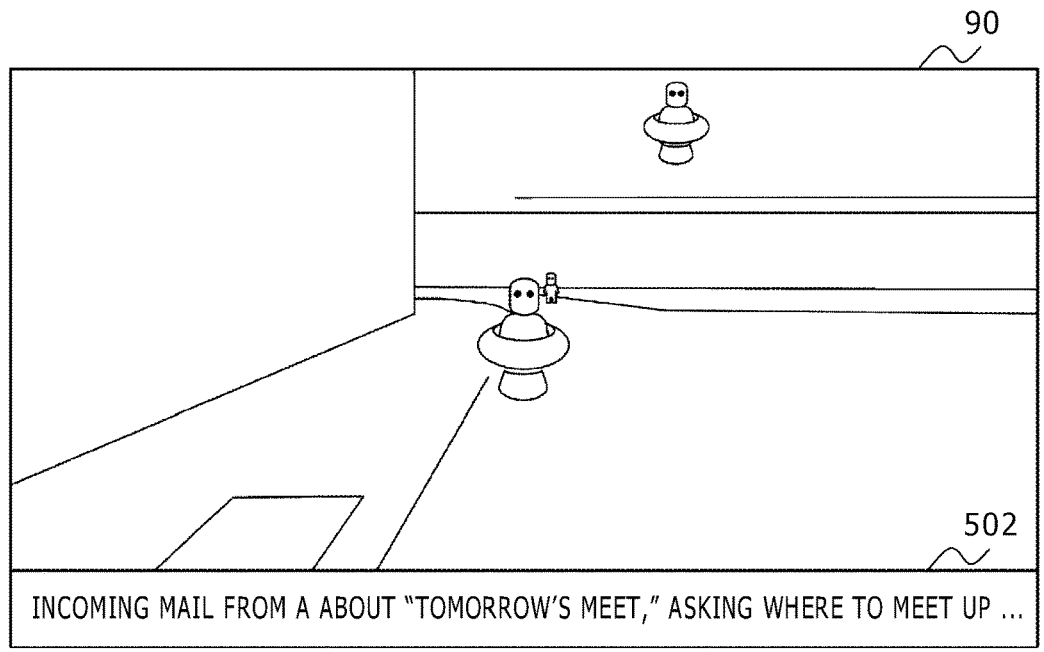
FIG. 28 is a schematic view showing another typical image displayed on the display device of the head-mounted display.

FIG. 28 shows another typical image displayed on the display device 90 of the head-mounted display 100. When the mailing application of the mobile information terminal 200 receives a mail during the game, the HMD display information generating unit 216 generates the information to be displayed on the display device 90 of the head-mounted display 100 by acquiring information about the received mail. The HMD display information receiving unit 317 of the game device 10 receives from the mobile information terminal 200 the information to be displayed on the display device 90 of the head-mounted display 100. In turn, the HMD image data generating unit 313 generates the image data that includes the received information. In the example of FIG. 28, the display device 90 of the head-mounted display 100 displays, in a display area 502 at the bottom of the screen, the sender of the mail received by the mobile information terminal 200, the title of the received mail, and a text portion at the beginning of the mail.

The settings for the information to be displayed on the display device 90 of the head-mounted display 100 may be received beforehand from the user via the touch panel 262 of the mobile information terminal 200. This allows the user to have a look at necessary information about the mobile information terminal 200 while using the head-mounted display 100. If necessary, the user may interrupt the viewing of the head-mounted display 100 and use the mobile information terminal 200. At this point, the information displayed on the display device 90 of the head-mounted display 100 need not to be displayed on the touch panel 262 of the mobile information terminal 200. This prevents the people around the user from viewing the user's information.

The position and size of the display area 502 displaying the information received from the mobile information terminal 200 may be determined depending on the current game status or in accordance with the settings received from the user. Because the aspect ratio of the image to be displayed does not coincide with that of the display area of the display device 90, there may remain a blank area at the top, bottom, right margin, or left margin of the screen. That image-free area may then be utilized as the display area 502.

The user may operate the mobile information terminal 200 while viewing the display device 90 of the head-mounted display 100. Where the input function of the game device 10 such as the input device 20 is used to operate the mobile information terminal 200, the game device 10 transmits the input instructions received from the input device 20 to the mobile information terminal 200. The collaborative application of the mobile information terminal 200 forwards the received input instructions to a target application such as the mailing application. Where the input function of the head-mounted display 100 such as the touch pads 140 is used to operate the mobile information terminal 200, the head-mounted display 100 transmits the input instructions received from the touch pads 140, for example, directly or via the game device 10 to the mobile information terminal 200. Where the touch panel 262 of the mobile information terminal 200 is used to operate the mobile information terminal 200, the input instructions are received directly by the target application or indirectly via the collaborative application.

Figure 29:
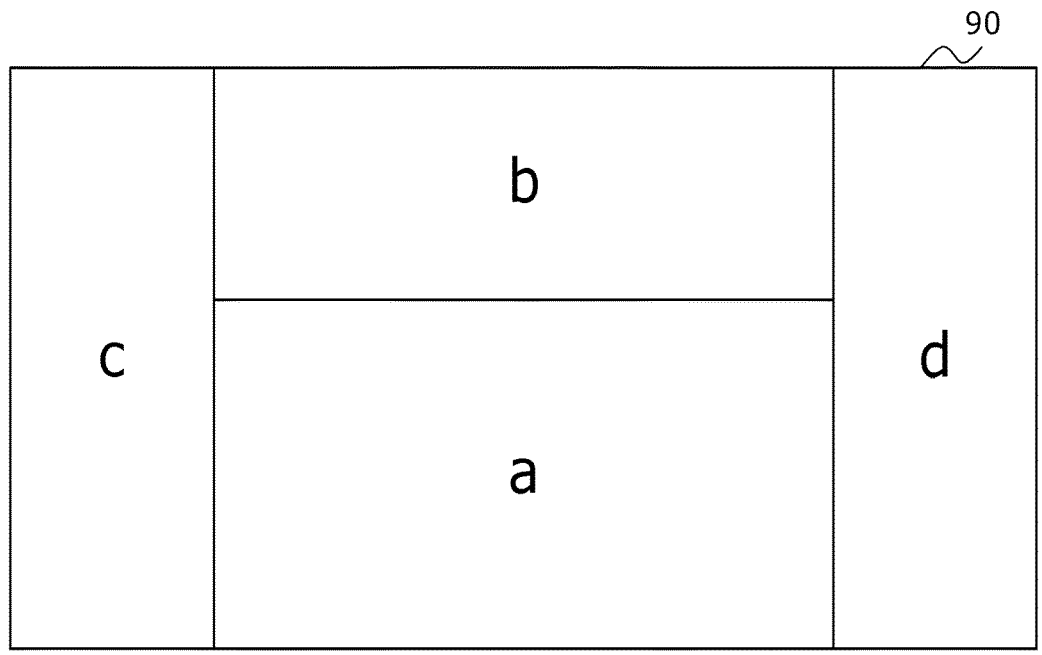
FIG. 29 is a schematic view showing the corresponding relation between a display area on the display device of the head-mounted display on one hand and input areas of the touch panel and touch pads on the other hand.

FIG. 29 shows the corresponding relation between the display area on the display device 90 of the head-mounted display 100 on one hand and the input areas of the touch panel 262 and of each touch pad 140 on the other hand. As described above, this embodiment includes multiple touch panels 262 and touch pads 140. Thus, the input position adjusting unit 312 of the game device 10 associates the position of the input to the touch panel 262 and to each touch pad 140 with the position in the image displayed on the display device 90 of the head-mounted display 100. In the example of FIG. 29, inside the image displayed on the display device 90 of the head-mounted display 100, an area a is associated with the touch panel 262 of the mobile information terminal 200; an area b is associated with the touch pad 140 disposed on the upper surface of the head-mounted display 100; an area c is associated with the touch pad 140 disposed on the left head side of the head-mounted display 100; and an area d is associated with the touch pad 140 disposed on the right head side of the head-mounted display 100. In this case, it is preferred that the user's field of view coincide as much as possible with the actual locations at which the touch panel 262 and touch pads 140 are disposed. This provides an interface that allows the user to perform operations without becoming aware of inconsistencies between body sensation and visual sensation.

Each of the above display areas may differ in size or shape from the input area of the touch panel 262 and of each touch pad 140. If that happens with the touch panel 262, the input position adjusting unit 212 of the mobile information terminal 200 associates the actual input position with the input position in the assigned input area. In the case of the touch pads 140, the input position adjusting unit 162 of the head-mounted display 100 associates the actual input position with the input position in the assigned input area.

Figure 30:
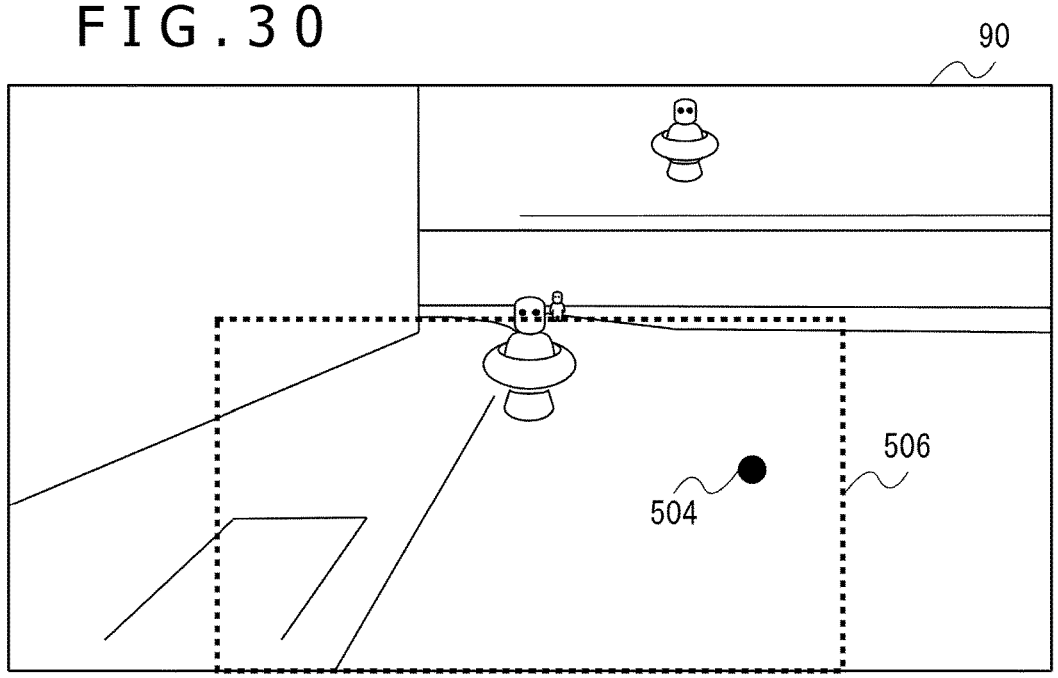
FIG. 30 is a schematic view showing another typical image displayed on the display device of the head-mounted display.

FIG. 30 shows another typical image displayed on the display device 90 of the head-mounted display 100. When the input information receiving unit 311 receives input information, the input position adjusting unit 312 of the game device 10 displays a marker 504 indicating the input position at the adjusted position, together with an area frame 506 corresponding to the touch panel 262 or the touch pad 140 that has received the input. In this manner, where there are multiple touch pads 140 as well as the touch panels 262, the user is shown comprehensibly which of the touch panels 262 and touch pads 140 to touch to make input to the desired position. The user is also shown comprehensibly where to touch on the touch panel 262 or on the touch pad 140.

Figure 31:
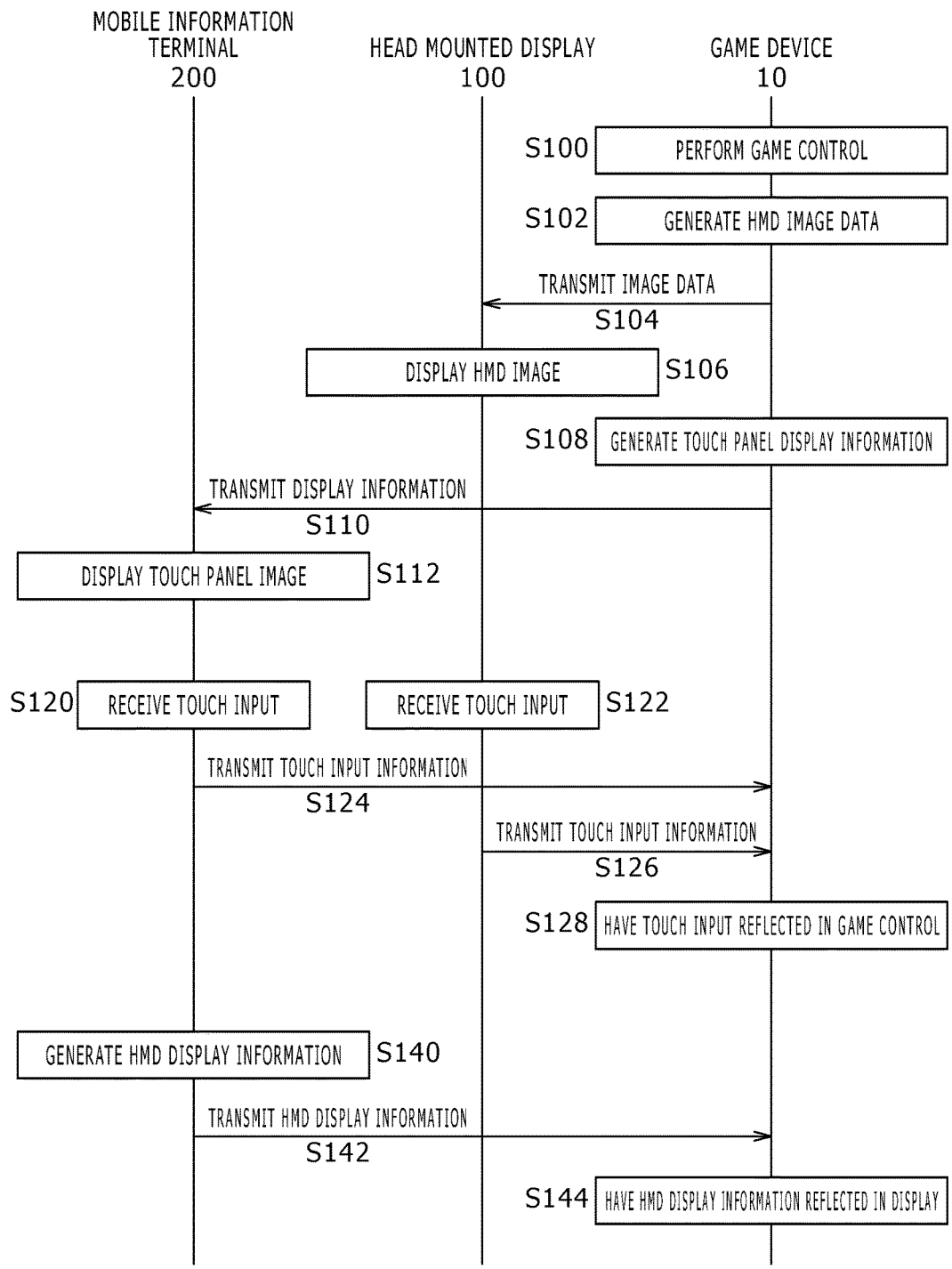
FIG. 31 is a sequence diagram showing the steps constituting a display control method according to the embodiment.

FIG. 31 is a sequence diagram showing the steps constituting the display control method according to the embodiment. The game controlling unit 319 of the game device 10 controls the game (S100). The HMD image data generating unit 313 generates the image data to be displayed on the head-mounted display 100 (S102). The HMD image data transmitting unit 314 transmits the image data to the head-mounted display 100 (S104). The HMD display controlling unit 165 of the head-mounted display 100 displays the image data on the display device 90 (S106).

The touch panel display information generating unit 315 of the game device 10 generates information for displaying game status and other information on the touch panel 262 of the mobile information terminal 200 (S108). The touch panel display information transmitting unit 316 transmits the display information to the mobile information terminal 200

(S110). The touch panel display controlling unit 215 of the mobile information terminal 200 displays the display information on the touch panel 262 (S112).

When the user touches the touch panel 262 of the mobile information terminal 200 for input, the touch input receiving unit 211 receives the input (S120). The input position adjusting unit 212 adjusts the position of the touch input, and the input information transmitting unit 213 transmits the input information to the game device 10 (S124). When the user touches any touch pad 140 of the head-mounted display 100 for input, the touch input receiving unit 161 receives the input (S122). The input position adjusting unit 162 adjusts the position of the touch input, and the input information transmitting unit 163 transmits the input information to the game device 10 (S126). When the input information receiving unit 311 of the game device 10 receives the input information from the mobile information terminal 200 or from the head-mounted display 100, the input position adjusting unit 312 adjusts the position of the touch input, and the game controlling unit 319 causes the touch input to be reflected in game control (S128). Control is then returned to step S100.

The HMD display information generating unit 216 generates the information to be displayed on the head-mounted display 100 when, for example, the mobile information terminal 200 receives a mail (S140). In this case, the HMD display information transmitting unit 217 transmits the display information to the game device 10 (S142). When the HMD display information receiving unit 317 of the game device 10 receives the display information from the mobile information terminal 200, the HMD image data generating unit 313 causes the display information to be reflected in the display (S144). Control is then returned to step S102.

The present invention was described above using specific embodiment as an example. It is to be understood by those skilled in the art that suitable combinations of constituent elements and processes of the embodiment may lead to further variations of the present invention and that such variations also fall within the scope of this invention.

In the above examples, a monocular vision image is displayed on the display device 90 of the head-mounted display 100. As an alternative, a binocular stereoscopic vision image may be displayed. In this case, the binocular stereoscopic vision image may be displayed on the touch panel 262 of the mobile information terminal 200 while the monocular vision image may be displayed on the touch panel 262.

In the above examples, the game device 10 controls the game to generate the image data to be displayed on the display device 90 of the head-mounted display 100. Alternatively, the head-mounted display 100 may be configured to control the game to generate the image data. In this case, the game device 10 is not needed. The mobile information terminal 200 may directly communicate with the head-mounted display 100 without the intervention of the game device 10.

Whereas the game system uses the head-mounted display 100 in the above examples, the techniques described in conjunction with the embodiment may be used to display contents other than the games. In a display system that does not include any dedicated input device such as a game controller, the head-mounted display 100 according to the embodiment may be used to input the user's instructions easily via the touch pads or the touch panel of the mobile information terminal.

REFERENCE SIGNS LIST

10 Game device
90 Display device
100 Head-mounted display
140 Touch pad
161 Touch input receiving unit
162 Input position adjusting unit
163 Input information transmitting unit
164 HMD image data receiving unit
165 HMD display controlling unit
200 Mobile information terminal
211 Touch input receiving unit
212 Input position adjusting unit
213 Input information transmitting unit
214 Touch panel display information receiving unit
215 Touch panel display controlling unit
216 HMD display information generating unit
217 HMD display information transmitting unit
262 Touch panel
311 Input information receiving unit
312 Input position adjusting unit
313 HMD image data generating unit
314 HMD image data transmitting unit
315 Touch panel display information generating unit
316 Touch panel display information transmitting unit
317 HMD display information receiving unit
319 Game controlling unit

INDUSTRIAL APPLICABILITY

The present invention can be applied to implementing the head-mounted display.

The invention claimed is:

1. A head-mounted display wearable on the head of a user, the head-mounted display comprising:
   a display device disposed on an inner surface of the head-mounted display worn by the user on the head;
   a plurality of touch sensitive input devices, each disposed on an outer surface of the head-mounted display worn by the user on the head, each of the input devices having a respective input area being able to detect contact with or proximity of a body part of the user; and
   a display controlling unit configured to acquire data of an image generated based on input information indicative of the input device detecting the contact with or the proximity of the body part of the user, the display controlling unit further causing the display device to display the acquired image data,
   wherein each of the respective input areas of the respective input devices is associated with a respective one of a plurality of divided areas making up the image, such that contact with, or the proximity, of the body part of the user to each of the respective input areas of the respective input devices causes a respective manipulation of the associated, respective divided areas making up the image.

2. The head-mounted display according to claim 1, wherein
   the input device is a touch panel including a touch pad doubling as a display panel, the touch pad being able to detect the contact with or the proximity of the body part of the user, and
   the display panel displays an image related to the image displayed on the display device.

3. The head-mounted display according to claim 1, wherein the input device is a mobile information terminal having a processing apparatus and a touch panel including a touch pad doubling as a display panel, the touch pad being able to detect the contact with or the proximity of the body part of the user, and the display device is able to display information about an application executed by the processing apparatus.

4. The head-mounted display according to claim 1, wherein, when the user performs input to the input device in a manner corresponding to an action performed by hand near the head in the real world, the image is generated to reflect the result supposedly caused by the action in the real world.

5. A display control method comprising:
disposing a display device on an inner surface of a head-mounted display worn on a head of a user;
disposing each of a plurality of touch sensitive input devices on an outer surface of the head-mounted display, each of the input devices having a respective input area being able to detect contact with or proximity of a body part of the user;
acquiring data of an image generated based on input information indicative of the input device detecting the contact with or the proximity of the body part of the user, and further causing the display device to display the acquired image data,
wherein each of the respective input areas of the respective input devices is associated with a respective one of a plurality of divided areas making up the image, such that contact with, or the proximity, of the body part of the user to each of the respective input areas of the respective input devices causes a respective manipulation of the associated, respective divided areas making up the image.

6. A display system comprising:
a head-mounted display configured to be wearable on the head of a user; and
an image processing apparatus configured to generate an image to be displayed on the head-mounted display,
wherein the head-mounted display includes
a display device disposed on an inner surface of the head-mounted display worn by the user on the head;
a plurality of touch sensitive input devices, each disposed on an outer surface of the head-mounted display worn by the user on the head, each of the input devices having a respective input area being able to detect contact with or proximity of a body part of the user; and
a display controlling unit configured to acquire data of an image generated based on input information indicative of the input device detecting the contact with or the proximity of the body part of the user, the display controlling unit further causing the display device to display the acquired image data,
wherein each of the respective input areas of the respective input devices is associated with a respective one of a plurality of divided areas making up the image, such that contact with, or the proximity, of the body part of the user to each of the respective input areas of the respective input devices causes a respective manipulation of the associated, respective divided areas making up the image, and
the image processing apparatus includes
an image generating unit configured to acquire the input information and generate the image data based on the input information.

* * * * *